(12) United States Patent
Zhang et al.

(10) Patent No.: US 11,683,531 B2
(45) Date of Patent: Jun. 20, 2023

(54) TWO-PART SIGNALING OF ADAPTIVE LOOP FILTERS IN VIDEO CODING

(71) Applicants: Beijing Bytedance Network Technology Co., Ltd., Beijing (CN); Bytedance Inc., Los Angeles, CA (US)

(72) Inventors: Li Zhang, San Diego, CA (US); Hongbin Liu, Beijing (CN); Kai Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/696,560

(22) Filed: Mar. 16, 2022

(65) Prior Publication Data

US 2022/0217340 A1 Jul. 7, 2022

Related U.S. Application Data

(63) Continuation of application No. PCT/CN2020/116086, filed on Sep. 18, 2020.

(30) Foreign Application Priority Data

Sep. 18, 2020 (WO) ................ PCT/CN2019/106420

(51) Int. Cl.
*H04N 19/82* (2014.01)
*H04N 19/186* (2014.01)
(Continued)

(52) U.S. Cl.
CPC ........... *H04N 19/82* (2014.11); *H04N 19/117* (2014.11); *H04N 19/174* (2014.11); *H04N 19/186* (2014.11); *H04N 19/70* (2014.11)

(58) Field of Classification Search
CPC ..... H04N 19/117; H04N 19/174; H04N 19/70
See application file for complete search history.

(56) References Cited

U.S. PATENT DOCUMENTS 9,077,998 B2   7/2015   Wang et al.
9,247,258 B2   1/2016   Coban et al.
(Continued)

FOREIGN PATENT DOCUMENTS

CN   102804776 A   11/2012
CN   103081467 A   5/2013
(Continued)

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
(Continued)

*Primary Examiner* — Fabio S Lima
(74) *Attorney, Agent, or Firm* — Perkins Coie LLP

(57) ABSTRACT

Methods, systems and devices for signaling the usage of adaptive loop filtering in image and video coding are described. An example method of video processing includes determining, for a conversion between a current region of a video and a bitstream representation of the video, whether a luma adaptive loop filter is used during the conversion and whether luma adaptive loop filter coefficients are included in the bitstream representation, wherein a single syntax element in the bitstream representation is indicative of use of the luma adaptive loop filter and signaling of the luma adaptive loop filter coefficients, and performing, based on the determining, the conversion.

18 Claims, 17 Drawing Sheets

(51) Int. Cl.
*H04N 19/70* (2014.01)
*H04N 19/117* (2014.01)
*H04N 19/174* (2014.01)

(56) References Cited

U.S. PATENT DOCUMENTS

| | | | |
|---|---|---|---|
| 9,473,779 | B2 | 10/2016 | Rapaka et al. |
| 9,591,325 | B2 | 3/2017 | Li et al. |
| 9,628,792 | B2 | 4/2017 | Rapaka et al. |
| 9,807,406 | B2 | 10/2017 | Ramasubramonian et al. |
| 10,057,574 | B2 | 8/2018 | Li et al. |
| 10,321,130 | B2 | 6/2019 | Dong et al. |
| 10,404,999 | B2 | 9/2019 | Liu et al. |
| 10,506,230 | B2 | 12/2019 | Zhang et al. |
| 10,531,111 | B2 | 1/2020 | Li et al. |
| 10,708,592 | B2 | 7/2020 | Dong et al. |
| 10,721,469 | B2 | 7/2020 | Zhang et al. |
| 10,728,573 | B2 | 7/2020 | Sun et al. |
| 10,778,974 | B2 | 9/2020 | Karczewicz et al. |
| 10,855,985 | B2 | 12/2020 | Zhang et al. |
| 10,965,941 | B2 | 3/2021 | Zhao et al. |
| 2012/0039383 | A1 | 2/2012 | Huang et al. |
| 2017/0238020 | A1 | 8/2017 | Karczewicz et al. |
| 2018/0041778 | A1 | 2/2018 | Zhang et al. |
| 2018/0041779 | A1 | 2/2018 | Zhang et al. |
| 2018/0184127 | A1 | 6/2018 | Zhang et al. |
| 2018/0192050 | A1 | 7/2018 | Zhang et al. |
| 2018/0197276 | A1 | 7/2018 | Kim et al. |
| 2019/0215532 | A1 | 7/2019 | He et al. |
| 2019/0230353 | A1 | 7/2019 | Gadde et al. |
| 2019/0238845 | A1 | 8/2019 | Zhang et al. |
| 2019/0306502 | A1 | 10/2019 | Gadde et al. |
| 2020/0092574 | A1 | 3/2020 | Li et al. |
| 2020/0120359 | A1 | 4/2020 | Hanhart et al. |
| 2020/0236353 | A1 | 7/2020 | Zhang et al. |
| 2020/0260120 | A1 | 8/2020 | Hanhart et al. |
| 2020/0267381 | A1 | 8/2020 | Vanam et al. |
| 2020/0314418 | A1 | 10/2020 | Wang et al. |
| 2020/0322632 | A1 | 10/2020 | Hanhart et al. |
| 2020/0344473 | A1* | 10/2020 | Seregin .................. H04N 19/70 |
| 2020/0413038 | A1 | 10/2020 | Zhang et al. |
| 2020/0374540 | A1 | 11/2020 | Wang et al. |
| 2021/0076034 | A1 | 3/2021 | Misra et al. |
| 2021/0084340 | A1 | 3/2021 | Li et al. |
| 2021/0120275 | A1 | 4/2021 | Misra et al. |
| 2021/0136413 | A1 | 5/2021 | He et al. |
| 2021/0185353 | A1 | 6/2021 | Xiu et al. |
| 2021/0211662 | A1 | 7/2021 | Wang et al. |
| 2021/0235109 | A1 | 7/2021 | Liu et al. |
| 2021/0314628 | A1 | 10/2021 | Zhang et al. |
| 2021/0321095 | A1 | 10/2021 | Zhang et al. |
| 2021/0321121 | A1 | 10/2021 | Zhang et al. |
| 2021/0337228 | A1 | 10/2021 | Wang et al. |
| 2021/0337239 | A1 | 10/2021 | Zhang et al. |
| 2021/0368171 | A1 | 11/2021 | Zhang et al. |
| 2021/0377524 | A1 | 12/2021 | Zhang et al. |
| 2021/0385446 | A1 | 12/2021 | Liu et al. |
| 2021/0392381 | A1 | 12/2021 | Wang et al. |
| 2021/0409703 | A1 | 12/2021 | Wang et al. |
| 2022/0007014 | A1 | 1/2022 | Wang et al. |
| 2022/0132113 | A1* | 4/2022 | Paluri .................. H04N 19/132 |
| 2022/0159249 | A1* | 5/2022 | Taquet .................. H04N 19/82 |
| 2022/0210478 | A1 | 6/2022 | Zhang et al. |

FOREIGN PATENT DOCUMENTS

| | | |
|---|---|---|
| CN | 103796015 A | 5/2014 |
| CN | 106331709 A | 1/2017 |
| CN | 107750459 A | 3/2018 |
| WO | 2011087932 A1 | 7/2011 |
| WO | 2016130801 A1 | 8/2016 |
| WO | 2016204373 A1 | 12/2016 |
| WO | 2016204531 A1 | 12/2016 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Eglimez et al. "Non-CE5: A Simplification of ALF Coefficient Signalling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0669, 2019.

"Information Technology—High Efficiency Coding and Media Delivery in Heterogeneous Environments—Part 2: High Efficiency Video Coding" Apr. 20, 2018, ISO/DIS 23008, 4th Edition.

Karczewicz et al. "Geometry Transformation-based Adaptive In-Loop Filter," 2016 IEEE, Picture Coding Symposium (PCS), 2016.

Lim et al. "CE2: Subsampled Laplacian Calculation (Test 6.1, 6.2, 6.3, and 6.4)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0147, 2018.

Socek et al. "CE2-related: Alternate ALF Filter Shapes for Luma," Joint Video Experts Team (JVET) of ITU-T SG 16 WP 3 and ISO/IEC JTC 1/SC 29/WG 1113th Meeting: Marrakech, MA, Jan. 9-18, 2019, document JVET-M0461, 2019.

https://vcgit.hhi.fraunhofer.de/jvet/VVCSoftware_VTM/tags/VTM-2.1.

International Search Report and Written Opinion from International Patent Application No. PCT/CN2020/116084 dated Dec. 16, 2020 (9 pages).

International Search Report and Written Opinion from International Patent Application No. PCT/CN2020/116086 dated Dec. 16, 2020 (9 pages).

Non Final Office Action from U.S. Appl. No. 17/696,583 dated Jul. 7, 2022.

Extended European Search Report from European Patent Application No. 20866732.9 dated Sep. 22, 2022 (8 pages).

\* cited by examiner

TWO-PART SIGNALING OF ADAPTIVE LOOP FILTERS IN VIDEO CODING

CROSS-REFERENCE TO RELATED APPLICATION

This application is a continuation of International Patent Application No. PCT/CN2020/116086, filed on Sep. 18, 2020, which claims the priority to and benefits of International Patent Application No. PCT/CN2019/106420 filed on Sep. 18, 2019. All the aforementioned patent applications are hereby incorporated by reference in their entireties.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which adaptive loop filtering is used.

In one example aspect a method of video processing is disclosed. The method includes determining, for a conversion between a current region of a video and a bitstream representation of the video, whether a luma adaptive loop filter is used during the conversion and whether luma adaptive loop filter coefficients are included in the bitstream representation, wherein a single syntax element in the bitstream representation is indicative of use of the luma adaptive loop filter and signaling of the luma adaptive loop filter coefficients, and performing, based on the determining, the conversion.

In another example aspect a method of video processing is disclosed. The method includes performing a conversion between a current region of a video and a bitstream representation of the video, wherein an adaptive loop filter is used during the conversion, and wherein the bitstream representation conforms to a syntax rule that specifies that coefficients of the adaptive loop filter signaled in the bitstream representation include zero-valued adaptive loop filter coefficients.

In yet another example aspect a method of video processing is disclosed. The method includes determining, for a conversion between a current region of a video and a bitstream representation of the video, that zero-valued adaptive loop filter coefficients of a previous region of the video signaled in the bitstream representation are not used in the conversion, and performing, based on the determining, the conversion.

In yet another example aspect a method of video processing is disclosed. The method includes performing a conversion between a current region of a video and a bitstream representation of the video, wherein the bitstream representation conforms to a syntax rule that specifies a flag indicating whether in-loop filtering is used for the conversion is included in the bitstream representation at a video unit level comprising the current region that is smaller than a slice level of the video.

In yet another example aspect a method of video processing is disclosed. The method includes performing a conversion between a current region of a video and a bitstream representation of the video, wherein the conversion comprises using an adaptive loop filter, and wherein the bitstream representation is configured to indicate the adaptive loop filter using a two-part signaling including a first part indicative of a technique of determining the adaptive loop filter, and a second part indicative of an index used by the technique.

In yet another example aspect a method of video processing is disclosed. The method includes determining, based on a property of a video, a size of a current region of the video that shares a common loop filtering setting for a conversion between the current region and a bitstream representation of the video, and performing, based on the determining, the conversion.

In yet another example aspect a method of video processing is disclosed. The method includes performing a lossless conversion between a current region of the video and a bitstream representation of the video, wherein the bitstream representation conforms to a syntax rule that restricts a value of a syntax field associated with the current region in the bitstream representation due to the conversion being lossless.

In yet another example aspect, the above-described method is embodied in the form of processor-executable code and stored in a computer-readable program medium.

In yet another example aspect, a device that is configured or operable to perform the above-described method is disclosed. The device may include a processor that is programmed to implement this method.

In yet another example aspect, a video decoder apparatus may implement a method as described herein.

The above and other aspects and features of the disclosed technology are described in greater detail in the drawings, the description and the claims.

DETAILED DESCRIPTION

Figure 1:
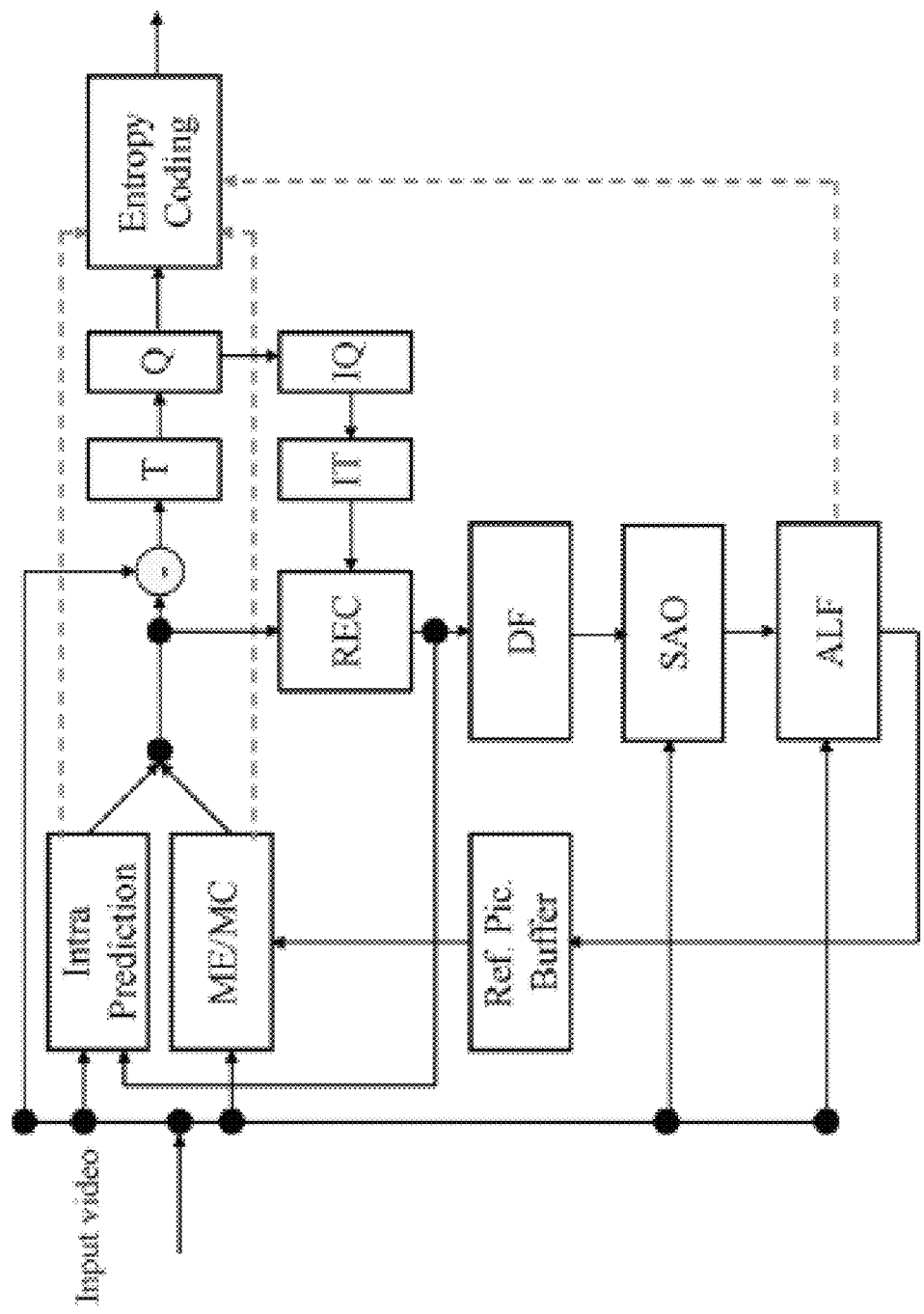
FIG. 1 is an example of encoder block diagram.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Summary

This document is related to video coding technologies. Specifically, it is related to adaptive loop filter in video coding or decoding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 6) could be found at:

http://phenix.it-sudparis.eu/jvet/doc_end_user/documents/15_Gothenburg/wg11/JVET-O2001-v14.zip The latest reference software of VVC, named VTM, could be found at:

https://vcgit.hhi.fraunhofer.de/jvet/VVCSoftware_VTM/tags/VTM-2.1

2.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved. This reduces the bandwidth of an uncompressed video signal by one-third with little to no visual difference

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In JPEG/JFIF, H.261, and MPEG-1, Cb and Cr are sited interstitially, halfway between alternate luma samples.
- In 4:2:0 DV, Cb and Cr are co-sited in the horizontal direction. In the vertical direction, they are co-sited on alternating lines.

2.2. Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3. Geometry Transformation-Based Adaptive Loop Filter in JEM

In the JEM, a geometry transformation-based adaptive loop filter (GALF) with block-based filter adaption is applied. For the luma component, one among 25 filters is selected for each 2×2 block, based on the direction and activity of local gradients.

2.3.1. Filter Shape

Figure 2:
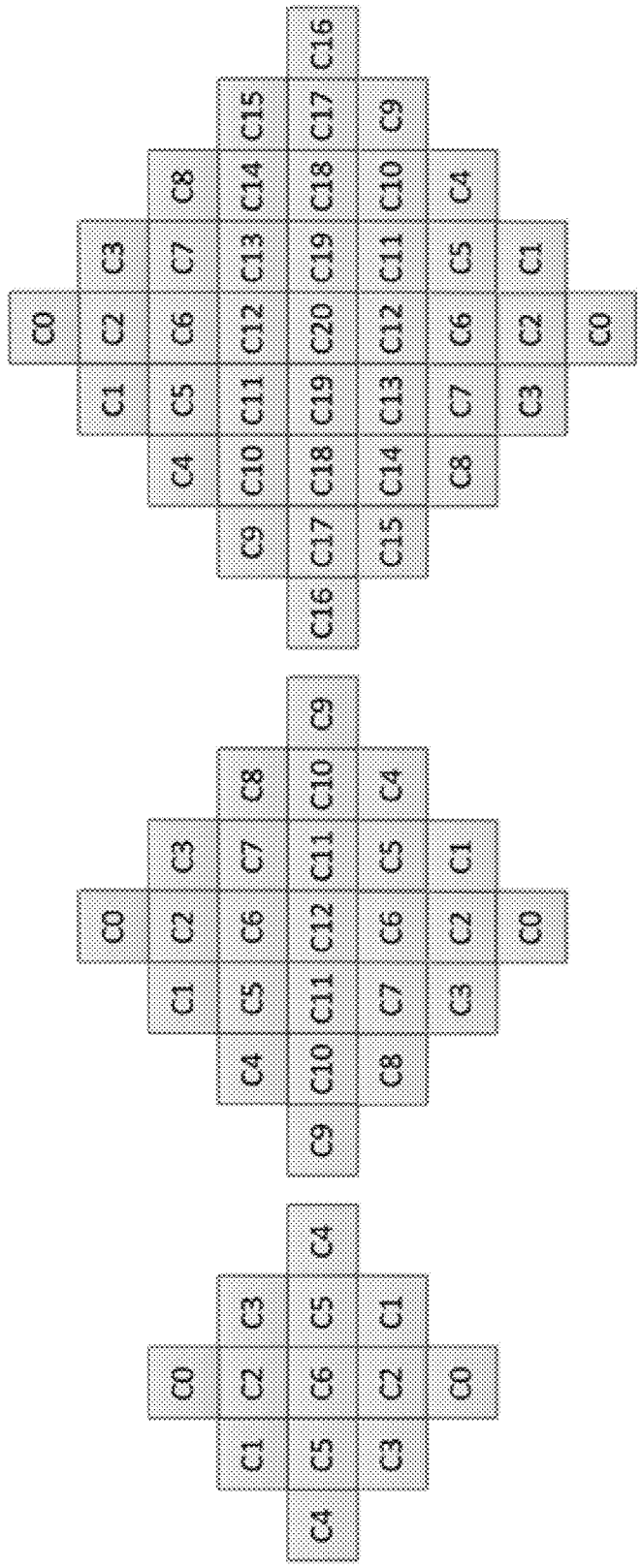
FIG. 2 shows examples of GALF filter shapes (left: 5×5 diamond, middle: 7×7 diamond, right: 9×9 diamond).

In the JEM, up to three diamond filter shapes (as shown in FIG. 2) can be selected for the luma component. An index is signalled at the picture level to indicate the filter shape used for the luma component.

FIG. 2 shows examples of GALF filter shapes (left: 5×5 diamond, middle: 7×7 diamond, right: 9×9 diamond).

For chroma components in a picture, the 5×5 diamond shape is always used.

2.3.1.1. Block Classification

Each 2×2 block is categorized into one out of 25 classes. The classification index C is derived based on its directionality D and a quantized value of activity $\hat{A}$, as follows:

$$C = 5D + \hat{A}. \tag{1}$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k, l) - R(k, l-1) - R(k, l+1)|, \quad (2)$$

$$g_h = \sum_{k=i-2}^{i+3} \sum_{l=j-2}^{j+3} H_{k,l}, \quad H_{k,l} = |2R(k, l) - R(k-1, l) - R(k+1, l)|, \quad (3)$$

$$g_{d1} = \sum_{k=i-2}^{i+3} \sum_{l=j-3}^{j+3} D1_{k,l}, \quad (4)$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \quad (5)$$

$$D2_{k,l} = |2R(k, l) - R(k-1, l+1) - R(k+1, l-1)|$$

Indices i and j refer to the coordinates of the upper left sample in the 2×2 block and R(i, j) indicates a reconstructed sample at coordinate (i, j).

Then D maximum and minimum values of the gradients of horizontal and vertical directions are set as:

$$g_{h,v}^{max} = max(g_h, g_v), g_{h,v}^{min} = min(g_h, g_v), \quad (6)$$

and the maximum and minimum values of the gradient of two diagonal directions are set as:

$$g_{d0,d1}^{max} = max(g_{d0}, g_{d1}), g_{d0,d1}^{min} = min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as Â.

For both chroma components in a picture, no classification method is applied, i.e. a single set of ALF coefficients is applied for each chroma component.

2.3.1.2. Geometric Transformations of Filter Coefficients

Before filtering each 2×2 block, geometric transformations such as rotation or diagonal and vertical flipping are applied to the filter coefficients f(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(k, K-l-1)$,

Vertical flip: $f_v(k,l) = F(k, K-l-1)$,

Rotation: $f_R(k,l) = f(K-l-1, k)$. (9)

where K is the size of the filter and $0 \leq k$, $l \leq K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 1.

TABLE 1

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.3.1.3. Filter Parameters Signalling

In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures, and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f(k, l) can still be sent for this class in which case the coefficients of the filter which will be applied to the reconstructed image are sum of both sets of coefficients.

The filtering process of luma component can controlled at CU level. A flag is signalled to indicate whether GALF is applied to the luma component of a CU. For chroma component, whether GALF is applied or not is indicated at picture level only.

2.3.1.4. Filtering Process

At decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i,j)=\Sigma_{k=-L/2}^{L/2} \Sigma_{l=-L/2}^{L/2} f(k,l) \times R(i+k,j+l) \quad (10)$$

2.3.1.5. Encoding Side Filter Parameters Determination Process

Figure 3:
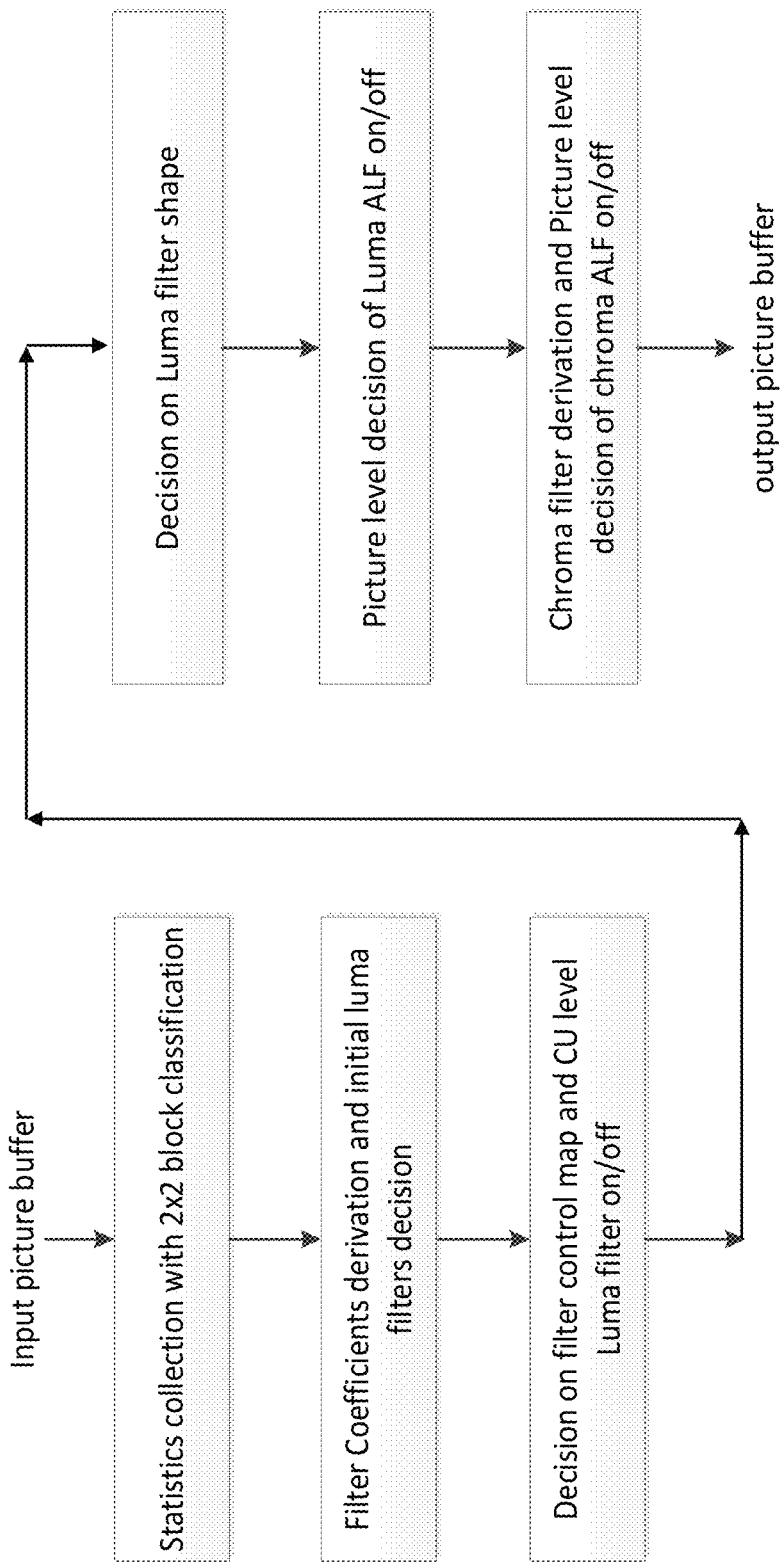
FIG. 3 is a flow-graph of one implementation of encoder decision for GALF.

Overall encoder decision process for GALF is illustrated in FIG. 3. For luma samples of each CU, the encoder makes a decision on whether or not the GALF is applied and the appropriate signalling flag is included in the slice header. For chroma samples, the decision to apply the filter is done based on the picture-level rather than CU-level. Furthermore, chroma GALF for a picture is checked only when luma GALF is enabled for the picture.

2.4. Geometry Transformation-Based Adaptive Loop Filter in VVC

The current design of GALF in VVC has the following major changes compared to that in JEM:

1) The adaptive filter shape is removed. Only 7×7 filter shape is allowed for luma component and 5×5 filter shape is allowed for chroma component.
2) Temporal prediction of ALF parameters and prediction from fixed filters are both removed.
3) For each CTU, one bit flag is signaled whether ALF is enabled or disabled.
4) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

Figure 4:
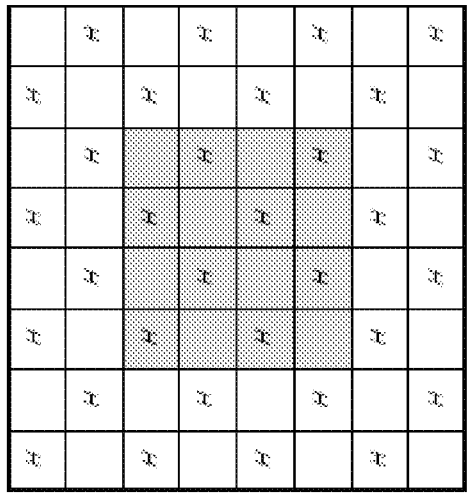
FIG. 4 shows examples of subsampled Laplacian calculation for CE2.6.2. Top left (a) Subsampled positions for vertical gradient, top right (b) Subsampled positions for horizontal gradient, bottom left (c) Subsampled positions for diagonal gradient and bottom right (d) Subsampled positions for diagonal gradient.
Figure 4:
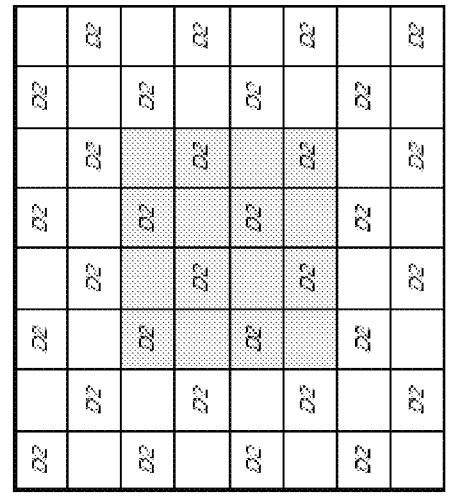
Figure 4:
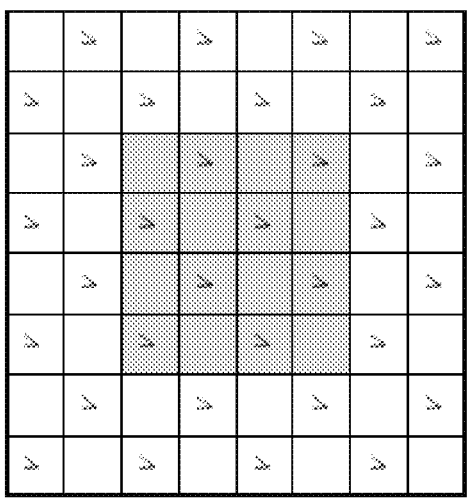
Figure 4:
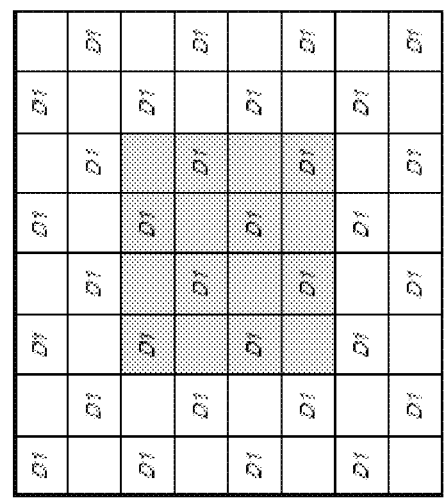

FIG. 4 shows examples of subsampled Laplacian calculation for CE2.6.2. Top left (a) Subsampled positions for vertical gradient, top right (b) Subsampled positions for horizontal gradient, bottom left (c) Subsampled positions for diagonal gradient and bottom right (d) Subsampled positions for diagonal gradient.

2.5. Signaling of Adaptive Loop Filter Parameters in Adaptation Parameter Set

In the latest version of VVC draft, ALF parameters can be signaled in Adaptation Parameter Set (APS) and can be selected by each CTU adaptively.

The detailed signaling of ALF (in JVET-O2001-vE) is as follows.

7.3.2.5 Adaptation Parameter Set Syntax

|  | Descriptor |
| --- | --- |
| adaptation_parameter_set_rbsp( ) { |  |
|   adaptation_parameter_set_id | u (5) |
|   aps_params_type | u (3) |
|   if( aps_params_type = = ALF_APS ) |  |
|     alf_data( ) |  |
|   else if( aps_params_type = = LMCS_APS ) |  |
|     lmcs_data( ) |  |
|   else if( aps_params_type = = SCALING_APS ) |  |
|     scaling_list_data( ) |  |
|   aps_extension_flag | u (1) |
|   if( aps_extension_flag ) |  |
|     while ( more_rbsp_data( ) ) |  |
|       aps_extension_data_flag | u (1) |
|   rbsp_trailing_bits( ) |  |
| } |  |

7.3.2.14 Adaptive Loop Filter Data Syntax

|  | Descriptor |
| --- | --- |
| alf_data( ) { |  |
|   alf_luma_filter_signal_flag | u (1) |
|   alf_chroma_filter_signal_flag | u (1) |
|   if( alf_luma_filter_signal_flag ) { |  |
|     alf_luma_clip_flag | u (1) |
|     alf_luma_num_filters_signalled_minus1 | ue (v) |
|     if( alf_luma_num_filters_signalled_minus1 > 0 ) { |  |
|       for( filtIdx = 0; filtIdx < NumAlfFilters; filtIdx++ ) |  |
|         alf_luma_coeff_delta_idx[ filtIdx ] | u (v) |
|     } |  |
|     alf_luma_coeff_signalled_flag | u (1) |
|     if( alf_luma_coeff_signalled_flag ) { |  |
|       for( sfIdx = 0; sfIdx <= alf_luma_num_filters_signalled_minus1; sfIdx++ ) |  |
|         alf_luma_coeff_flag[ sfIdx ] | u (1) |
|     } |  |
|     for( sfIdx = 0; sfIdx <= alf_luma_num_filters_signalled_minus1; sfIdx++ ) { |  |
|       if( alf_luma_coeff_flag[ sfIdx ]) { |  |
|         for ( j = 0; j < 12; j++ ) { |  |
|           alf_luma_coeff_abs[ sfIdx ][ j ] | uek (v) |
|           if( alf_luma_coeff_abs[ sfIdx ][ j ] ) |  |
|             alf_luma_coeff_sign[ sfIdx ][ j ] | u (1) |
|         } |  |
|       } |  |
|     } |  |
|     if( alf_luma_clip_flag ) { |  |
|       for( sfIdx = 0; sfIdx <= alf_luma_num_filters_signalled_minus1; sfIdx++ ) |  |
|     { |  |
|       if( alf_luma_coeff_flag[ sfIdx ]) { |  |
|         for ( j = 0; j < 12; j++ ) |  |

| | Descriptor |
|---|---|
|               alf_luma_clip_idx[ sfIdx ][ j ] | u (2) |
|             } | |
|           } | |
|         } | |
|       } | |
|     } | |
|   if( alf_chroma_filter_signal_flag ) { | |
|     alf_chroma_num_alt_filters_minus1 | ue (v) |
|     for( altIdx = 0; altIdx <= alf_chroma_num_alt_filters_minus1; altIdx++ ) { | |
|       alf_chroma_clip_flag[ altIdx ] | u (1) |
|       for( j = 0; j < 6; j++ ) { | |
|         alf_chroma_coeff_abs[ altIdx ][ j ] | uek (v) |
|         if( alf_chroma_coeff_abs[ altIdx ][ j ] > 0 ) | |
|           alf_chroma_coeff_sign[ altIdx ][ j ] | u (1) |
|       } | |
|       if( alf_chroma_clip_flag[ altIdx ] ) { | |
|         for( j = 0; j < 6; j++ ) | |
|           alf_chroma_clip_idx[ altIdx ][ j ] | u (2) |
|       } | |
|     } | |
|   } | |
| } | |

7.4.3.5 Adaptation Parameter Set Semantics

Each APS RBSP shall be available to the decoding process prior to it being referred, included in at least one access unit with TemporalId less than or equal to the TemporalId of the coded slice NAL unit that refers it or provided through external means.

Let aspLayerId be the nuh_layer_id of an APS NAL unit. If the layer with nuh_layer_id equal to aspLayerId is an independent layer (i.e., vps_independent_layer_flag[GeneralLayerIdx[aspLayerId]] is equal to 1), the APS NAL unit containing the APS RBSP shall have nuh_layer_id equal to the nuh_layer_id of a coded slice NAL unit that refers it. Otherwise, the APS NAL unit containing the APS RBSP shall have nuh_layer_id either equal to the nuh_layer_id of a coded slice NAL unit that refers it, or equal to the nuh_layer_id of a direct dependent layer of the layer containing a coded slice NAL unit that refers it.

All APS NAL units with a particular value of adaptation_parameter_set_id and a particular value of aps_params_type within an access unit shall have the same content.

adaptation_parameter_set_id provides an identifier for the APS for reference by other syntax elements.

When aps_params_type is equal to ALF_APS or SCALING_APS, the value of adaptation_parameter_set_id shall be in the range of 0 to 7, inclusive.

When aps_params_type is equal to LMCS_APS, the value of adaptation_parameter_set_id shall be in the range of 0 to 3, inclusive.

aps_params_type specifies the type of APS parameters carried in the APS as specified in Table 7-2. When aps_params_type is equal to 1 (LMCS_APS), the value of adaptation_parameter_set_id shall be in the range of 0 to 3, inclusive.

TABLE 7-2

APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3..7 | Reserved | Reserved |

NOTE 1—Each type of APSs uses a separate value space for adaptation_parameter_set_id.

NOTE 2—An APS NAL unit (with a particular value of adaptation_parameter_set_id and a particular value of aps_params_type) can be shared across pictures, and different slices within a picture can refer to different ALF APSs.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification shall ignore all aps_extension_data_flag syntax elements.

7.4.3.14 Adaptive Loop Filter Data Semantics alf_luma_filter_signal_flag equal to 1 specifies that a luma filter set is signalled.

alf_luma_filter_signal_flag equal to 0 specifies that a luma filter set is not signalled.

alf_chroma_filter_signal_flag equal to 1 specifies that a chroma filter is signalled.

alf_chroma_filter_signal_flag equal to 0 specifies that a chroma filter is not signalled. When ChromaArrayType is equal to 0, alf_chroma_filter_signal_flag shall be equal to 0. The variable NumAlfFilters specifying the number of different adaptive loop filters is set equal to 25.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adaptive loop filter classes for which luma coefficients can be signalled. The value of alf_luma_num_filters_signalled_minus1 shall be in the range of 0 to NumAlfFilters−1, inclusive.

alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log2(alf_luma_num_filters_signalled_minus1+1)) bits.

alf_luma_coeff_signalled_flag equal to 1 indicates that alf_luma_coeff_flag[sfIdx] is signalled. alf_luma_coeff_signalled_flag equal to 0 indicates that alf_luma_coeff_flag[sfIdx] is not signalled.

alf_luma_coeff_flag[sfIdx] equal 1 specifies that the coefficients of the luma filter indicated by sfIdx are signalled. alf_luma_coeff_flag[sfIdx] equal to 0 specifies that all filter coefficients of the luma filter indicated by sfIdx are set equal to 0. When not present, alf_luma_coeff_flag[sfIdx] is set equal to 1.

alf_luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0.

The order k of the exp-Golomb binarization uek(v) is set equal to 3.

alf_luma_coeff_sign[sfIdx][j] specifies the sign of the j-th luma coefficient of the filter indicated by sfIdx as follows:
If alf_luma_coeff_sign[sfIdx][j] is equal to 0, the corresponding luma filter coefficient has a positive value.
Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

The variable filtCoeff[sfIdx][j] with sfIdx=0 . . . alf_luma_num_filters_signalled_minus1, j=0 . . . 11 is initialized as follows:
filtCoeff[sfIdx][j]=alf_luma_coeff_abs[sfIdx][j]*(7-47)
(1—2*alf_luma_coeff_sign[sfIdx][j])

The luma filter coefficients $AlfCoeff_L$[adaptation_parameter_set_id] with elements $AlfCoeff_L$[adaptation_parameter_set_id][filtIdx][j], with filtIdx=0 . . . NumAlfFilters−1 and j=0 . . . 11 are derived as follows:
$AlfCoeff_L$[adaptation_parameter_set_id][filtIdx][j]=filtCoeff[alf_luma_coeff_delta_idx [filtIdx]][j](7-48)

The fixed filter coefficients AlfFixFiltCoeff[i][j] with i=0 . . . 64, j=0 . . . 11 and the class to filter mapping AlfClassToFiltMap[m][n] with m=0 . . . 15 and n=0 . . . 24 are derived as follows:

AlfFixFiltCoeff = (7-49)

```
{
 { 0,  0,   2,  -3,   1,  -4,   1,   7,  -1,   1,  -1,   5}
 { 0,  0,   0,   0,   0,  -1,   0,   1,   0,   0,  -1,   2}
 { 0,  0,   0,   0,   0,   0,   0,   1,   0,   0,   0,   0}
 { 0,  0,   0,   0,   0,   0,   0,   0,   0,   0,  -1,   1}
 { 2,  2,  -7,  -3,   0,  -5,  13,  22,  12,  -3,  -3,  17}
 { 1,  0,   6,  -8,   1,  -5,   1,  23,   0,   2,  -5,  10}
 { 0,  0,  -1,  -1,   0,  -1,   2,   1,   0,   0,  -1,   4}
 { 0,  0,   3, -11,   1,   0,  -1,  35,   5,   2,  -9,   9}
 { 0,  0,   8,  -8,  -2,  -7,   4,   4,   2,   1,  -1,  25}
 { 0,  0,   1,  -1,   0,  -3,   1,   3,  -1,   1,  -1,   3}
 { 0,  0,   3,  -3,   0,  -6,   5,  -1,   2,   1,  -4,  21}
 { 7,  1,   5,   4,  -3,   5,  11,  13,  12,  -8,  11,  12}
 { 5, -3,   6,  -2,  -3,   8,  14,  15,   2,  -7,  11,  16}
 { 2, -1,  -6,  -5,  -2,  -2,  20,  14,  -4,   0,  -3,  25}
 { 3,  1,  -8,  -4,   0,  -8,  22,   5,  -3,   2, -10,  29}
 { 2,  1,  -7,  -1,   2, -11,  23,  -5,   0,   2, -10,  29}
 { 6, -3,   8,   9,  -4,   8,   9,   7,  14,  -2,   8,   9}
 { 2,  1,  -4,  -7,   0,  -8,  17,  22,   1,  -1,  -4,  23}
 { 3,  0,  -5,  -7,   0,  -7,  15,  18,  -5,   0,  -5,  27}
 { 2,  0,   0,  -7,   1, -10,  13,  13,  -4,   2,  -7,  24}
 { 3,  3, -13,   4,  -2,  -5,   9,  21,  25,  -2,  -3,  12}
 { 5, -2,   7,  -3,  -7,   9,   8,   9,  16,  -2,  15,  12}
 { 0, -1,   0,  -7,  -5,   4,  11,  11,   8,  -6,  12,  21}
 { 3, -2,  -3,  -8,  -4,  -1,  16,  15,  -2,  -3,   3,  26}
 { 2,  1,  -5,  -4,  -1,  -8,  16,   4,  -2,   1,  -7,  33}
 { 2,  1,  -4,  -2,   1, -10,  17,  -2,   0,   2, -11,  33}
 { 1, -2,   7, -15, -16,  10,   8,   8,  20,  11,  14,  11}
 { 2,  2,   3, -13, -13,   4,   8,  12,   2,  -3,  16,  24}
 { 1,  4,   0,  -7,  -8,  -4,   9,   9,  -2,  -2,   8,  29}
 { 1,  1,   2,  -4,  -1,  -6,   6,   3,  -1,  -1,  -3,  30}
 { 7,  3,   2,  10,  -2,   3,   7,  11,  19,  -7,   8,  10}
 { 0, -2,  -5,  -3,  -2,   4,  20,  15,  -1,  -3,  -1,  22}
 { 3, -1,  -8,  -4,  -1,  -4,  22,   8,  -4,   2,  -8,  28}
 { 0,  3, -14,   3,   0,   1,  19,  17,   8,  -3,  -7,  20}
 { 0,  2,  -1,  -8,   3,  -6,   5,  21,   1,   1,  -9,  13}
 { 4, -2,   8,  20,  -2,   2,   3,   5,  21,   4,   6,   1}
 { 2, -2,  -3,  -9,  -4,   2,  14,  16,   3,  -6,   8,  24}
 { 2,  1,   5, -16,  -7,   2,   3,  11,  15,  -3,  11,  22}
 { 1,  2,   3, -11,  -2,  -5,   4,   8,   9,  -3,  -2,  26}
 { 0, -1,  10,  -9,  -1,  -8,   2,   3,   4,   0,   0,  29}
 { 1,  2,   0,  -5,   1,  -9,   9,   3,   0,   1,  -7,  20}
 { 2,  8,  -6,  -4,   3,  -9,  -8,  45,  14,   2, -13,   7}
 { 1, -1,  16, -19,  -8,  -4,  -3,   2,  19,   0,   4,  30}
 { 1,  1,  -3,   0,   2, -11,  15,  -5,   1,   2,  -9,  24}
 { 0,  1,  -2,   0,   1,  -4,   4,   0,   0,   1,  -4,   7}
 { 0,  1,   2,  -5,   1,  -6,   4,  10,  -2,   1,  -4,  10}
 { 3,  0,  -3,  -6,  -2,  -6,  14,   8,  -1,  -1,  -3,  31}
```

| AlfFixFiltCoeff = | | | | | | | | | | | (7-49) |
|---|---|---|---|---|---|---|---|---|---|---|---|
| { 0, | 1, | 0, | −2, | 1, | −6, | 5, | 1, | 0, | 1, | −5, | 13} |
| { 3, | 1, | 9, | −19, | −21, | 9, | 7, | 6, | 13, | 5, | 15, | 21} |
| { 2, | 4, | 3, | −12, | −13, | 1, | 7, | 8, | 3, | 0, | 12, | 26} |
| { 3, | 1, | −8, | −2, | 0, | −6, | 18, | 2, | −2, | 3, | −10, | 23} |
| { 1, | 1, | −4, | −1, | 1, | −5, | 8, | 1, | −1, | 2, | −5, | 10} |
| { 0, | 1, | −1, | 0, | 0, | −2, | 2, | 0, | 0, | 1, | −2, | 3} |
| { 1, | 1, | −2, | −7, | 1, | −7, | 14, | 18, | 0, | 0, | −7, | 21} |
| { 0, | 1, | 0, | −2, | 0, | −7, | 8, | 1, | −2, | 0, | −3, | 24} |
| { 0, | 1, | 1, | −2, | 2, | −10, | 10, | 0, | −2, | 1, | −7, | 23} |
| { 0, | 2, | 2, | −11, | 2, | −4, | −3, | 39, | 7, | 1, | −10, | 9} |
| { 1, | 0, | 13, | −16, | −5, | −6, | −1, | 8, | 6, | 0, | 6, | 29} |
| { 1, | 3, | 1, | −6, | −4, | −7, | 9, | 6, | −3, | −2, | 3, | 33} |
| { 4, | 0, | −17, | −1, | −1, | 5, | 26, | 8, | −2, | 3, | −15, | 30} |
| { 0, | 1, | −2, | 0, | 2, | −8, | 12, | −6, | 1, | 1, | −6, | 16} |
| { 0, | 0, | 0, | −1, | 1, | −4, | 4, | 0, | 0, | 0, | −3, | 11} |
| { 0, | 1, | 2, | −8, | 2, | −6, | 5, | 15, | 0, | 2, | −7, | 9} |
| { 1, | −1, | 12, | −15, | −7, | −2, | 3, | 6, | 6, | −1, | 7, | 30} |
| }, | | | | | | | | | | | |

| AlfClassToFiltMap = (7-50) | | | | | | | | | | | | | | | | | | | | | | | |
|---|---|---|---|---|---|---|---|---|---|---|---|---|---|---|---|---|---|---|---|---|---|---|---|---|
| { | | | | | | | | | | | | | | | | | | | | | | | | |
| { 8, | 2, | 2, | 2, | 3, | 4, | 53, | 9, | 9, | 52, | 4, | 4, | 5, | 9, | 2, | 8, | 10, | 9, | 1, | 3, | 39, | 39, | 10, | 9, | 52 } |
| { 11, | 12, | 13, | 14, | 15, | 30, | 11, | 17, | 18, | 19, | 16, | 20, | 20, | 4, | 53, | 21, | 22, | 23, | 14, | 25, | 26, | 26, | 27, | 28, | 10 } |
| { 16, | 12, | 31, | 32, | 14, | 16, | 30, | 33, | 53, | 34, | 35, | 16, | 20, | 4, | 7, | 16, | 21, | 36, | 18, | 19, | 21, | 26, | 37, | 38, | 39 } |
| { 35, | 11, | 13, | 14, | 43, | 35, | 16, | 4, | 34, | 62, | 35, | 35, | 30, | 56, | 7, | 35, | 21, | 38, | 24, | 40, | 16, | 21, | 48, | 57, | 39 } |
| { 11, | 31, | 32, | 43, | 44, | 16, | 4, | 17, | 34, | 45, | 30, | 20, | 20, | 7, | 5, | 21, | 22, | 46, | 40, | 47, | 26, | 48, | 63, | 58, | 10 } |
| { 12, | 13, | 50, | 51, | 52, | 11, | 17, | 53, | 45, | 9, | 30, | 4, | 53, | 19, | 0, | 22, | 23, | 25, | 43, | 44, | 37, | 27, | 28, | 10, | 55 } |
| { 30, | 33, | 62, | 51, | 44, | 20, | 41, | 56, | 34, | 45, | 20, | 41, | 41, | 56, | 5, | 30, | 56, | 38, | 40, | 47, | 11, | 37, | 42, | 57, | 8 } |
| { 35, | 11, | 23, | 32, | 14, | 35, | 20, | 4, | 17, | 18, | 21, | 20, | 20, | 20, | 4, | 16, | 21, | 36, | 46, | 25, | 41, | 26, | 48, | 49, | 58 } |
| { 12, | 31, | 59, | 59, | 3, | 33, | 33, | 59, | 59, | 52, | 4, | 33, | 17, | 59, | 55, | 22, | 36, | 59, | 59, | 60, | 22, | 36, | 59, | 25, | 55 } |
| { 31, | 25, | 15, | 60, | 60, | 22, | 17, | 19, | 55, | 55, | 20, | 20, | 53, | 19, | 55, | 22, | 46, | 25, | 43, | 60, | 37, | 28, | 10, | 55, | 52 } |
| { 12, | 31, | 32, | 50, | 51, | 11, | 33, | 53, | 19, | 45, | 16, | 4, | 4, | 53, | 5, | 22, | 36, | 18, | 25, | 43, | 26, | 27, | 27, | 28, | 10 } |
| { 5, | 2, | 44, | 52, | 3, | 4, | 53, | 45, | 9, | 3, | 4, | 56, | 5, | 0, | 2, | 5, | 10, | 47, | 52, | 3, | 63, | 39, | 10, | 9, | 52 } |
| { 12, | 34, | 44, | 44, | 3, | 56, | 56, | 62, | 45, | 9, | 56, | 56, | 7, | 5, | 0, | 22, | 38, | 40, | 47, | 52, | 48, | 57, | 39, | 10, | 9 } |
| { 35, | 11, | 23, | 14, | 51, | 35, | 20, | 41, | 56, | 62, | 16, | 20, | 41, | 56, | 7, | 16, | 21, | 38, | 24, | 40, | 26, | 26, | 42, | 57, | 39 } |
| { 33, | 34, | 51, | 51, | 52, | 41, | 41, | 34, | 62, | 0, | 41, | 41, | 56, | 7, | 5, | 56, | 38, | 38, | 40, | 44, | 37, | 42, | 57, | 39, | 10 } |
| { 16, | 31, | 32, | 15, | 60, | 30, | 4, | 17, | 19, | 25, | 22, | 20, | 4, | 53, | 19, | 21, | 22, | 46, | 25, | 55, | 26, | 48, | 63, | 58, | 55 } |
| }, | | | | | | | | | | | | | | | | | | | | | | | | |

It is a requirement of bitstream conformance that the values of AlfCoeff$_L$[adaptation_parameter_set_id][filtIdx][j] with filtIdx=0 . . . NumAlfFilters−1, j=0 . . . 11 shall be in the range of −2$^7$ to 2$^7$−1, inclusive.

alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values AlfClip$_L$[adaptation_parameter_set_id] with elements AlfClip$_L$[adaptation_parameter_set_id][filtIdx][j], with filtIdx=0 . . . NumAlfFilters−1 and j=0 . . . 11 are derived as specified in Table 7-4 depending on bitDepth set equal to BitDepth$_Y$ and clipIdx set equal to alf_luma_clip_idx[alf_luma_coeff_delta_idx[filtIdx]][j].

alf_chroma_num_alt_filters_minus1 plus 1 specifies the number of alternative filters for chroma components.

alf_chroma_chp_flag[altIdx] equal to 0 specifies that linear adaptive loop filtering is applied on chroma components when using the chroma filter with index altIdx; alf_chroma_clip_flag[altIdx] equal to 1 specifies that non-linear adaptive loop filtering is applied on chroma components when using the chroma filter with index altIdx. When not present, alf_chroma_clip_flag[altIdx] is inferred to be equal to 0.

alf_chroma_coeff_abs[altIdx][j] specifies the absolute value of the j-th chroma filter coefficient for the alternative chroma filter with index altIdx. When alf_chroma_coeff_abs[altIdx][j] is not present, it is inferred to be equal 0. It is a requirement of bitstream conformance that the values of alf_chroma_coeff_abs[altIdx][j] shall be in the range of 0 to 2$^7$−1, inclusive.

The order k of the exp-Golomb binarization uek(v) is set equal to 3.

alf_chroma_coeff_sign[altIdx][j] specifies the sign of the j-th chroma filter coefficient for the alternative chroma filter with index altIdx as follows:

If alf_chroma_coeff_sign[altIdx][j] is equal to 0, the corresponding chroma filter coefficient has a positive value.

Otherwise (alf_chroma_coeff_sign[altIdx][j] is equal to 1), the corresponding chroma filter coefficient has a negative value.

When alf_chroma_coeff_sign[altIdx][j] is not present, it is inferred to be equal to 0.

The chroma filter coefficients AlfCoeff$_C$[adaptation_parameter_set_id][altIdx] with elements AlfCoeff$_C$[adaptation_parameter_set_id][altIdx][j], with altIdx=0 . . . alf_chroma_num_alt_filters_minus1, j=0 . . . 5 are derived as follows:

AlfCoeffc[adaption_parameter_set_id][altIdx][j]=
alf_chroma_coeff_abs[altIdx][j]*
(1−2*alf_chroma_coeff_sign[altIdx][j ])     (7-51)

It is a requirement of bitstream conformance that the values of AlfCoeff$_C$[adaptation_parameter_set_id][altIdx][j] with altIdx=0 . . . alf_chroma_num_alt_filters_minus1, j=0 . . . 5 shall be in the range of $-2^7-1$ to $2^7-1$, inclusive.

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive. The chroma filter clipping values AlfClip$_C$[adaptation_parameter_set_id][altIdx] with elements AlfClip$_C$[adaptation_parameter_set_id][altIdx][j], with altIdx=0 . . . alf_chroma_num_alt_filters_minus1, j=0 . . . 5 are derived as specified in Table 7-4 depending on bitDepth set equal to BitDepth$_C$ and clipIdx set equal to alf_chroma_clip_idx[altIdx][j].

TABLE 7-4

Specification AlfClip depending on bitDepth and clipIdx

| bitDepth | clipIdx | | | |
|---|---|---|---|---|
| | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

2.6. Signaling of ALF Parameters for a CTU

In the VTM6, ALF filter parameters are signalled in Adaptation Parameter Set (APS). In one APS, up to 25 sets of luma filter coefficients and clipping value indexes, and up to 8 sets of chroma filter coefficients and clipping value indexes could be signalled. To reduce bits overhead, filter coefficients of different classification for luma component can be merged. In slice header, the indices of the APSs used for the current slice are signaled.

Clipping value indexes, which are decoded from the APS, allow determining clipping values using a Luma table of clipping values and a Chroma table of clipping values. These clipping values are dependent of the internal bitdepth. More precisely, the Luma table of clipping values and Chroma table of clipping values are obtained by the following formulas:

$$AlfClip_L = \left\{\text{round}\left(2^{B\frac{N-n+1}{N}}\right) \text{ for } n \in [1 \ldots N]\right\}, \quad (3\text{-}11)$$

$$AlfClip_C = \left\{\text{round}\left(2^{(B-8)+8\frac{(N-n)}{N-1}}\right) \text{ for } n \in [1 \ldots N]\right\} \quad (3\text{-}12)$$

with B equal to the internal bitdepth and N equal to 4 which is the number of allowed clipping values in VTM6.0.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

More specifically, the followings apply:

Slice on/off control flags are firstly coded to indicate whether at least one CTU in the slice applies ALF. When it is true, for each CTU, the following are checked and signaled in order:

Related to Luma Part:
1. Whether ALF is applied to the luma CTB. If yes, go to step 2. Otherwise, no further signaling is needed.
2. Check the number of ALF APS used for current slice, denote it by numALFAPS.
3. If numALFAPS is equal to 0, index of fixed filter (e.g., alf_luma_fixed_filter_idx) is signaled. Otherwise, the following apply:
   signal a flag to indicate whether it is predicted from the first ALF APS or not.
   If not, go to step 4. Otherwise, signaling of ALF parameters for the luma CTB is stopped.
4. If numALFAPS is greater than 1, signal a flag to indicate whether it is predicted from ALF APS or not.
   If not, signal the index of fixed filters;
   If yes and numALFAPS is greater than 2, signal the index of ALF APS minus 1 with truncated unary.

Related to Chroma Part:
1. Whether ALF is applied to the Cb/Cr CTB. If yes, go to step 2. Otherwise, no further signaling is needed.
2. Signal the index of a filter associated with the i-th ALF APS wherein the APS index is signaled in slice header.

7.3.8.2 Coding Tree Unit Syntax

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag \| \| slice_sao_chroma_flag ) | |
|     sao( xCtb >> CtbLog2SizeY, yCtb >> CtbLog2SizeY ) | |
|   if( slice_alf_enabled_flag ){ | |
|     alf_ctb_flag[ 0 ][ xCtb >> CtbLog2SizeY ][ yCtb >> CtbLog2SizeY ] | ae (v) |
|     if( alf_ctb_flag[ 0 ][ xCtb >> CtbLog2SizeY ][ yCtb >> CtbLog2SizeY ] ) { | |
|       if( slice_num_alf_aps_ids_luma > 0 ) | |

|  | Descriptor |
|---|---|
|     alf_ctb_use_first_aps_flag | ae (v) |
|     if( !alf_ctb_use_first_aps_flag ) { |  |
|       if( slice_num_alf_aps_ids_luma > 1 ) |  |
|         alf_use_aps_flag | ae (v) |
|       if( alf_use_aps_flag ) { |  |
|         if( slice_num_alf_aps_ids_luma > 2 ) |  |
|           alf_luma_prev_filter_idx_minus1 | ae (v) |
|       } else |  |
|         alf_luma_fixed_filter_idx | ae (v) |
|       } |  |
|     } |  |
|     if( slice_alf_chroma_idc == 1 \|\| slice_alf_chroma_idc == 3 ) { |  |
|       alf_ctb_flag[ 1 ][ xCtb >> CtbLog2SizeY ][ yCtb >> CtbLog2SizeY ] | ae (v) |
|       if( alf_ctb_flag[ 1 ][ xCtb >> CtbLog2SizeY ][ yCtb >> CtbLog2SizeY ] |  |
|         && aps_alf_chroma_num_alt_filters_minus1 > 0 ) |  |
|         alf_ctb_filter_alt_idx[ 0 ][ xCtb >> CtbLog2SizeY ][ yCtb >> CtbLog2SizeY ] | ae (v) |
|     } |  |
|     if( slice_alf_chroma_idc == 2 \|\| slice_alf_chroma_idc == 3 ) { |  |
|       alf_ctb_flag[ 2 ][ xCtb >> CtbLog2SizeY ][ yCtb >> CtbLog2SizeY ] | ae (v) |
|       if( alf_ctb_flag[ 2 ][ xCtb >> CtbLog2SizeY ][ yCtb >> CtbLog2SizeY ] |  |
|         && aps_alf_chroma_num_alt_filters_minus1 > 0 ) |  |
|         alf_ctb_filter_alt_idx[ 1 ][ xCtb >> CtbLog2SizeY ][ yCtb >> CtbLog2SizeY ] | ae (v) |
|     } |  |
|   } |  |
|   if( slice_type == I && qtbtt_dual_tree_intra_flag ) |  |
|     dual_tree_implicit_qt_split ( xCtb, yCtb, CtbSizeY, 0 ) |  |
|   else |  |
|     coding_tree ( xCtb, yCtb, CtbSizeY, CtbSizeY, 1, 1, 0, 0, 0, 0, |  |
|         SINGLE_TREE, MODE_TYPE_ALL ) |  |
| } |  |

2.7. Partitioning of Pictures, Subpictures, Slices, Tiles, Bricks, and CTUs Subpicture: An Rectangular Region of One or More Slices within a Picture slice: An integer number of bricks of a picture that are exclusively contained in a single NAL unit.

NOTE—A slice consists of either a number of complete tiles or only a consecutive sequence of complete bricks of one tile.

tile: A rectangular region of CTUs within a particular tile column and a particular tile row in a picture.

brick: A rectangular region of CTU rows within a particular tile in a picture.

NOTE—A tile may be partitioned into multiple bricks, each of which consisting of one or more CTU rows within the tile. A tile that is not partitioned into multiple bricks is also referred to as a brick. However, a brick that is a true subset of a tile is not referred to as a tile.

brick scan: A specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture.

A picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

A subpicture contains one or more slices that collectively cover a rectangular region of a picture.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 5:
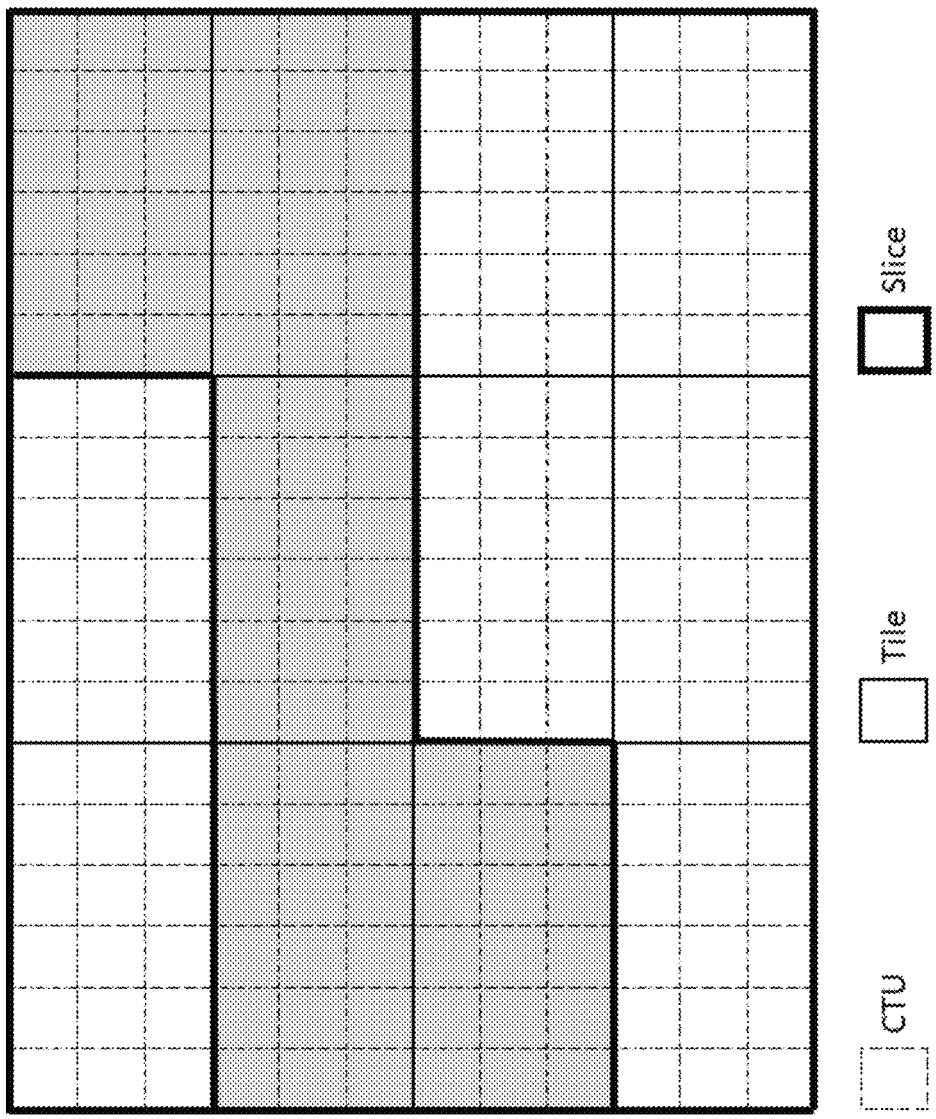
FIG. 5 shows an example of raster-scan slice partitioning of a picture, where the picture is divided into 12 tiles and 3 raster-scan slices.

FIG. 5 shows an example of raster-scan slice partitioning of a picture, where the picture is divided into 12 tiles and 3 raster-scan slices.

Figure 6:
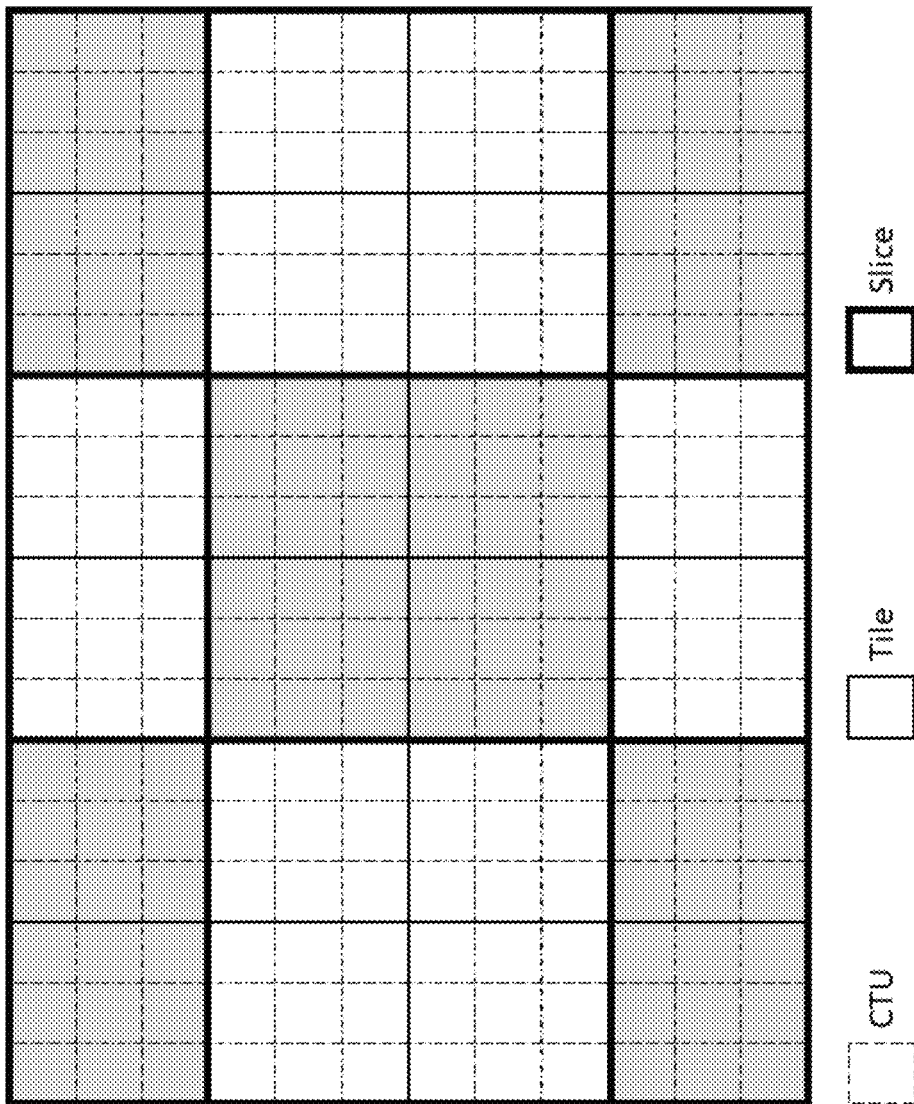
FIG. 6 shows a picture with 18 by 12 luma CTUs that is partitioned into 24 tiles and 9 rectangular slices.

FIG. 6 shows an example of rectangular slice partitioning of a picture, where the picture is divided into 24 tiles (6 tile columns and 4 tile rows) and 9 rectangular slices.

Figure 7:
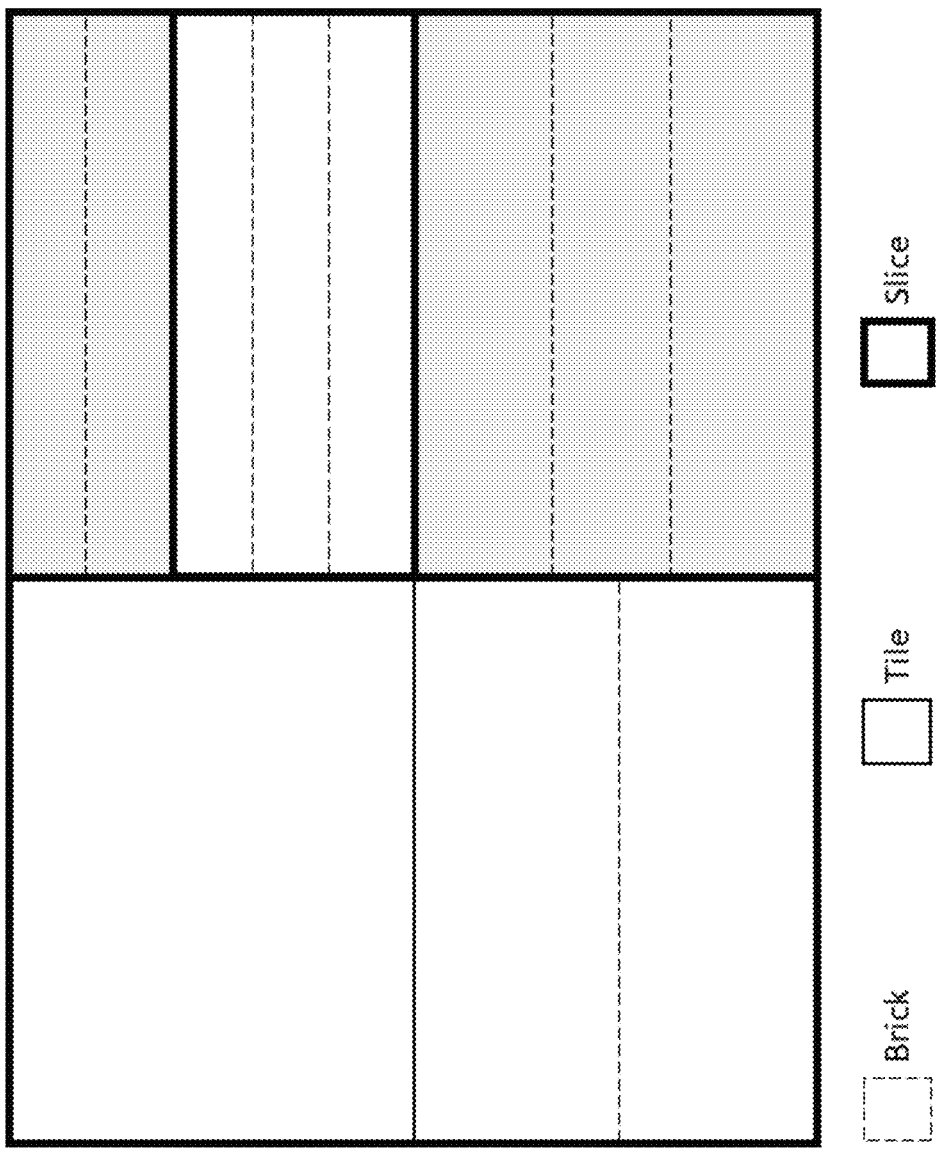
FIG. 7 shows an example of a picture that is partitioned into 4 tiles, 11 bricks, and 4 rectangular slices.

FIG. 7 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

Figure 8:
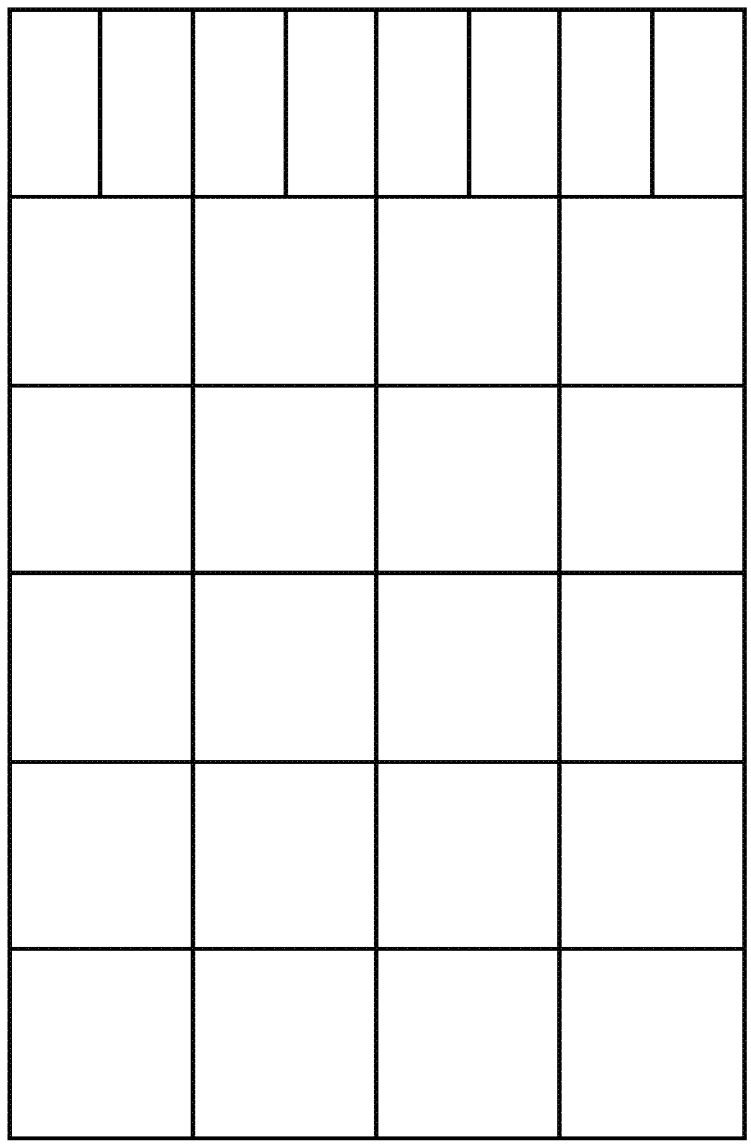
FIG. 8 shows a picture with 28 subpictures.

FIG. 8 shows an example of subpicture partitioning of a picture, where a picture is partitioned into 28 subpictures of varying dimensions.

When a picture is coded using three separate colour planes (separate_colour_plane_flag is equal to 1), a slice contains only CTUs of one colour component being identified by the corresponding value of colour_plane_id, and each colour component array of a picture consists of slices having the same colour_plane_id value. Coded slices with different values of colour_plane_id within a picture may be interleaved with each other under the constraint that for each value of colour_plane_id, the coded slice NAL units with that value of colour_plane_id shall be in the order of increasing CTU address in brick scan order for the first CTU of each coded slice NAL unit.

NOTE 1–When separate_colour_plane_flag is equal to 0, each CTU of a picture is contained in exactly one slice. When separate_colour_plane_flag is equal to 1, each CTU of a colour component is contained in exactly one slice (i.e., information for each CTU of a picture is present in exactly three slices and these three slices have different values of colour_plane_id).

2.8. RPR

AVC and HEVC does not have the ability to change resolution without having to introduce an IDR or intra random access point (IRAP) picture; such ability can be referred to as adaptive resolution change (ARC). There are use cases or application scenarios that would benefit from an ARC feature, such as Rate adaption in video telephony and conferencing. ARC is also known as Dynamic resolution conversion.

ARC may also be regarded as a special case of Reference Picture Resampling (RPR) such as H.263 Annex P.

In VVC, the ARC, a.k.a. RPR (Reference Picture Resampling) is incorporated in JVET-O 2001-v14. With RPR in JVET-O2001-v14, TMVP is disabled if the collocated picture has a different resolution to the current picture. Besides, BDOF and DMVR are disabled when the reference picture has a different resolution to the current picture. In SPS, the maximum picture resolution is defined. And for each picture in PPS, its resolution (including picture width and height in luma samples) are defined. When the picture resolution is different, the RPR is enabled.

2.9. Conformance Window in VVC

Conformance window in VVC defines a rectangle. Samples inside the conformance window belongs to the image of interest. Samples outside the conformance window may be discarded when output.

When conformance window is applied, the scaling ration in RPR is derived based on conformance windows.

7.3.2.4 Picture Parameter Set RBSP Syntax

| | Descriptor |
|---|---|
| pic_parameter_set_rbsp( ) { | |
|   pps_pic_parameter_set_id | ue (v) |
|   pps_seq_parameter_set_id | ue (v) |
|   pic_width_in_luma_samples | ue (v) |
|   pic_height_in_luma_samples | ue (v) |
|   conformance_window_flag | u (1) |
|   if( conformance_window_flag ) { | |
|     conf_win_left_offset | ue (v) |
|     conf_win_right_offset | ue (v) |
|     conf_win_top_offset | ue (v) |
|     conf_win_bottom_offset | ue (v) |
|   } | | pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:

pic_width_in_luma_samples*2 shall be greater than or equal to refPicWidthInLumaSamples.

pic_height_in_luma_samples*2 shall be greater than or equal to refPicHeightInLumaSamples.

pic_width_in_luma_samples shall be less than or equal to refPicWidthInLumaSamples*8.

pic_height_in_luma_samples shall be less than or equal to refPicHeightInLumaSamples*8.

conformance_window_flag equal to 1 indicates that the conformance cropping window offset parameters follow next in the SPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures in the CVS that are output from the decoding process, in terms of a rectangular region specified in picture coordinates for output.

When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples—(SubWidthC*conf_win_right_offset+1) and vertical picture coordinates from SubHeightC*conf_win_top_offset_to pic_height_in_luma_samples—(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

PicOutputWidthL=pic_width_in_luma_samples—(7-43) SubWidthC*(conf_win_right_offset+conf_win_left_offset)

PicOutputHeightL=pic_height_in_pic_size_units—(7-44) SubHeightC*(conf_win_bottom_offset+conf_win_top_offset)

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output.

All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of conf_win_left_offset, conf_win_right_offset, conf_win_top_offset, and conf_win_bottom_offset, respectively.

3. Technical Problems Solved by Technical Solutions Described Herein

The ALF data in APS has the following problem:
1. It has two flags to control whether luma ALF parameters are signaled or not, e.g., alf_luma_filter_signal_flag and alf_luma_coeff_signalled_flag, which is redundant.
2. It signals one flag for each class in the ALF to indicate whether all the ALF coefficients in that class are zero. This may be unnecessary because all zero ALF coefficients are rarely selected. Meanwhile, even with such flag, all zero ALF coefficients may still be signaled.
3. Multiple condition checks and steps are required to derive the filter predictors for the luma color component. It may bring unnecessary complexity.
4. In VVC, the portioning of a picture could be slice/tile/brick wherein brick is a smaller unit compared to slice/tile. Different bricks are disallowed to be predicted from each other. In real encoder, signaling ALF on/off in tile/brick level may bring additional benefit for coding performance.

4. Example Techniques and Embodiments

The listing below should be considered as examples to explain general concepts. These items should not be interpreted in a narrow way. Furthermore, these items can be combined in any manner.

In this document, the resolution (or dimensions, or width/height, or size) of a picture may refer to the resolution (or dimensions, or width/height, or size) of the coded/decoded picture, or may refer to the resolution (or dimensions, or width/height, or size) of the conformance window in the coded/decoded picture.

1. It is proposed that only one syntax element may be signaled to indicate whether there are luma ALF coefficients to be signaled.
   a. In one example, signaling of alf_luma_coeff_signalled_flag may be skipped.
   b. Alternatively, furthermore, whether to signal that the coefficients of the luma filter indicated by sfIdx (e.g., alf_luma_coeff_flag[sfIdx]) may be purely dependent on whether there is at least one filter needs to be signaled (e.g., alf_luma_filter_signal_flag).
   c. In one example, the signaling of alf_luma_coeff_flag may start from the last one (i.e., allowed largest filter index) to the first one.
   d. Alternatively, a counter is maintained to record how many filters have been coded or how many alf_luma_coeff_flags are equal to true.
      i. If the counter is equal to 0 before coding the information of the last filter, alf_luma_coeff_flag for the last filter (e.g., with the allowed largest filter index or index equal to 0, depending on the coding order) is not signaled, and derived to be true.
   e. Alternatively, furthermore, when the syntax indicates there are luma ALF coefficient to be signaled, a conformance bitstream shall satisfy that at least one coefficient of one luma filter is unequal to zero.
   f. Alternatively, furthermore, when the syntax indicates there are luma ALF coefficient to be signaled, a conformance bitstream shall satisfy that at least one luma filter is signaled (e.g., at least one aff_luma_coeff_flag[sfIdx] is true).
2. It is proposed that at when a class in ALF has all zero ALF coefficients, the all zero ALF coefficients may be still signaled.
   a. In one example, zero value (e.g., zero aff_luma_coeff_abs) may be signaled for each pair of positions that share the same ALF coefficients. For example, 12 zeros may be signaled for the 7*7 diamond ALF filter.
   b. In one example, no more than N (N is a non-negative integer) classes in ALF may have all zero ALF coefficients. For example, N=1.
3. It is proposed that when the luma/chroma ALF coefficients signaled in an APS are all zero for all classes, such luma/chroma ALF coefficients may not be used by the following pictures/slices/tiles/bricks/CTUs.
   a. Alternatively, furthermore, the zero ALF filter (e.g., all coefficients are zeros) is disallowed to be signaled in the APS.
   b. Alternatively, furthermore, it is a requirement of bitstream conformance that the signaled luma/chroma ALF coefficients in an APS shall contain at least one non-zero coefficient. For example, when the luma/chroma ALF coefficients only contains zero coefficients, it shall be indicated (e.g., by aff_luma_filter_signal_flag or aff_chroma_filter_signal_flag) that there are not luma/chroma ALF coefficients in the APS.
4. On/off control flags for indicating at least one CTU/CTB is coded with in-loop filtering method (e.g., SAO/ALF) enabled is removed from slice level (e.g., slice_aff_enabled_flag/slice_sao_luma_flag/slice_sao_chroma_flag) to a video unit level, and the video unit is smaller than a slice (e.g., brick/tile level).
   a. In one example, for each brick/tile, a flag may be coded to indicate whether the in-loop filtering method is applied to at least one sample in the brick/tile.
   b. In one example, the slice level on/off control flags for indicating at least one CTU/CTB is coded with the in-loop filtering method applied (e.g., slice_alf_enabled_flag) is replaced by flags signaled in brick/tile level.
   c. In one example, the slice level on/off control flags for indicating at least one CTU/CTB is coded with the in-loop filtering method applied (e.g., slice_alf_enabled_flag) is kept unchanged, and when this flag is true, on/off control flags in brick/tile level may be further signaled.
5. Signaling of ALF filters may be simplified to be with two parts, e.g., $1^{st}$ part to indicate whether it is predicted or selected from fixed filter or ALF APS; and $2^{nd}$ part is the index to the fixed filters/ALF APS.
   a. In one example, a flag may be signaled to indicate whether filters are predicted from fixed filters or not.
      i. Alternatively, a flag may be signaled to indicate whether filters are predicted from ALF APS or not.
      ii. Alternatively, a flag may be signaled/parsed to indicate whether the determined filter is selected from fixed ALF filters or not.
      iii. Alternatively, a flag may be signaled/parsed to indicate whether the determined filter is selected from ALF APS or not.
      iv. Alternatively, furthermore, such a flag may be signaled/parsed under the condition that number of ALF APS used for the color component (e.g., luma) is greater than 0 (or unequal to 0).
         a) In one example, when the number of the ALF APS used for the color component (e.g., luma) is equal to 0, such flag is not signaled/parsed, and it may be always inferred that a fixed ALF filter is used.
      v. In one example, the flag may be context coded or bypass coded.
         a) In one example, only one context may be utilized.
         b) Alternatively, more than one context may be utilized.

a. Alternatively, furthermore, context modeling may depend on the neighboring CTB's information.
b. Alternatively, furthermore, context modeling may depend on the information of current CTB, such as location of current CTB.
c. Alternatively, furthermore, context modeling may depend on the decoded information, such as slice/picture type.
b. Alternatively, furthermore, depending on the flag, the index to fixed filter or ALF APS may be signaled or parsed.
i. In one example, whether to signal the ALF APS index may further depend on the number of allowed ALF APS for current slice/tile/brick.
a) Alternatively, furthermore, when the number of allowed ALF APS for current slice/tile/brick is greater than 1, the index may be signaled. Otherwise, when the number of allowed ALF APS for current slice/tile/brick is equal to 1, the index may not be signaled, and the single ALF APS is used.
ii. In one example, indication of the ALF APS index may be signaled.
a) In one example, it may be signaled with truncated unary method. Alternatively, furthermore, with maximum value set to the number of allowed ALF APS for current slice/tile/brick minus K (e.g., K=0 or 1).
b) In one example, it may be signaled with truncated binary method. Alternatively, furthermore, with maximum value set to the number of allowed ALF APS for current slice/tile/brick minus K (e.g., K=0 or 1).
iii. In one example, the index may be context coded.
a) In one example, the first K bins of the binarized bin string of the index may be context coded and the remaining bins may be bypass coded (e.g., K=1 or based on number of ALF APSs).
b) In one example, all bins are bypass coded.
6. On/off control of filtering methods (e.g., SAO, bilateral filter, ALF) may be signaled/derived in a region level wherein the region size may be determined at least according to the picture resolution and the max picture resolution.
a. Alternatively, furthermore, the region is size is fixed for a picture but could be different for different pictures with different resolutions.
b. In one example, suppose the max picture width and height in luma sample are denoted by maxW and maxH, respectively; the current picture width and height in luma sample are denoted by currW and currH, respectively. The width and height of CTU/CTB are denoted by ctbW and ctbH, respectively. The region size, denoted by regW*regH, may be defined as:
i. Alternatively, furthermore, the on/off control flags and/or side information (e.g., predicted from which fixed filter and/or predicted from which ALF APS) may be signaled/parsed in the region level.
ii. In one example, regW may be set to (ctbW*currW/maxW).
iii. In one example, regH may be set to (ctbH*currH/maxH).
iv. In one example, regW and/or regH may further depend on the partitioning structure of current CTB.
a) Alternatively, furthermore, it may further depend on the first partitioning type (e.g., non-split (coded as a whole CTB); Quad-tree splitting; binary tree splitting; ternary tree splitting)
a. Alternatively, furthermore, the region size shall be no smaller than the sub-CUs which are directly split from the CTB.
b) In one example, regW may be set to ctbW*max ($R_W$, currW/maxW)
c) In one example, regH may be set to ctbH*max ($R_H$, currH/maxH)
d) In above example, $R_W$ and/or $R_H$ may be set to 1 for non-split case.
e) In above example, $R_W$ and/or $R_H$ may be set to ½ for quad-tree splitting case.
c. The above methods may be enabled when RPR is enabled for a sequence.
7. A conformance bitstream shall satisfy that when lossless coding (e.g., transquant_bypass_enabled_flag) is enabled for a sequence/picture, NAL unit type shall not be equal to APS_NUT (i.e., Adaptation parameter set).
a. A conformance bitstream shall satisfy that when lossless coding (e.g., transquant_bypass_enabled_flag) is enabled for a sequence/picture, aps_params_type shall not be equal to ALF_APS.
b. A conformance bitstream shall satisfy that when lossless coding (e.g., transquant_bypass_enabled_flag) is enabled for a sequence/picture, aps_params_type shall not be equal to LMCS_APS.
c. A conformance bitstream shall satisfy that when lossless coding (e.g., transquant_bypass_enabled_flag) is enabled for a sequence/picture, aps_params_type shall not be equal to SCALING_APS.
d. A conformance bitstream shall satisfy that when lossless coding (e.g., transquant_bypass_enabled_flag) is enabled for a sequence/picture, on/off control flags for some tools (e.g., ALF/LMCS/JCCR denoted by slice_alf_enabled_flag/alf_ctb_flag, slice_lmcs_enabled_flag, slice_joint_cbcr_sign_flag) at sequence/picture/slice/tile/brick/CTB/subpicture level and/or scaling list presenting flag (e.g., slice_scaling_list_present_flag) shall be equal to 0.
i. Alternatively, signaling of on/off control flags for those tools and/or scaling list presenting flag may be under the condition that the lossless coding is disabled for the picture.
8. Whether and/or how apply the above methods may be based on one or more conditions listed below:
a. Video contents (e.g. screen contents or natural contents)
b. A message signaled in the DPS/SPS/VPS/PPS/APS/picture header/slice header/tile group header/Largest coding unit (LCU)/Coding unit (CU)/LCU row/group of LCUs/TU/PU block/Video coding unit
c. Position of CU/PU/TU/block/Video coding unit
d. Decoded information of current block and/or its neighboring blocks
i. Block dimension/Block shape of current block and/or its neighboring blocks
e. Indication of the color format (such as 4:2:0, 4:4:4, RGB or YUV)
f. Coding tree structure (such as dual tree or single tree)
g. Slice/tile group type and/or picture type
h. Color component (e.g. may be only applied on luma component and/or chroma component)
i. Temporal layer ID
j. Profiles/Levels/Tiers of a standard

5. Example Embodiments of the Present Technology

The deleted parts are enclosed in double bolded brackets (e.g., [[a]] indicates that "a" has been deleted) and the newly added parts are enclosed in double bolded braces (e.g., {{a}} indicates that "a" has been added). The embodiment is on top of JVET-O2001-vE.

5.1. Embodiment #1

This embodiment gives some examples on how to signal ALF parameters in ALF APS.

7.3.2.15 Adaptive Loop Filter Data Syntax

| | Descriptor |
|---|---|
| alf_data( ) { | |
|   alf_luma_filter_signal_flag | u (1) |
|   alf_chroma_filter_signal_flag | u (1) |
|   if( alf_luma_filter_signal_flag ) { | |
|     alf_luma_clip_flag | u (1) |
|     alf_luma_num_filters_signalled_minus1 | ue (v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u (v) |
|     } | |
|     [[ alf_luma_coeff_signalled_flag | u (1) |
|     if( alf_luma_coeff_signalled_flag ) { ]] | |
|       for( sfIdx = 0; sfIdx <= alf_luma_num_filters_signalled_minus1; sfIdx++ ) | |
|         alf_luma_coeff_flag[ sfIdx ] | u (1) |
|     [[ } ]] | |
|     for( sfIdx = 0; sfIdx <= alf_luma_num_filters_signalled_minus1; sfIdx++ ) { | |
|       if( alf_luma_coeff_flag[ sfIdx ] ) { | |
|         for ( j = 0; j < 12; j++ ) { | |
|           alf_luma_coeff_abs[sfIdx ][ j ] | uek (v) |
|           if( alf_luma_coeff_abs[ sfIdx ][ j ] ) | |
|             alf_luma_coeff_sign[ sfIdx ][ j ] | u (1) |
|         } | |
|       } | |
|     } | |
|     if( alf_luma_clip_flag ) { | |
|       for( sfIdx = 0; sfIdx <= alf_luma_num_filters_signalled_minus1; sfIdx++ ) { | |
|         if( alf_luma_coeff_flag[ sfIdx ] ) { | |
|           for ( j = 0; j < 12; j++ ) | |
|             alf_luma_clip_idx[ sfIdx ][ j ] | u (2) |
|       [[ } ]] | |
|       } | |
|     } | |
|   } | |
|   if( alf_chroma_filter_signal_flag ) { | |
|     alf_chroma_num_alt_filters_minus1 | ue (v) |
|     for( altIdx = 0; altIdx <= alf_chroma_num_alt_filters_minus1; altIdx++ ) { | |
|       alf_chroma_clip_flag[ altIdx ] | u (1) |
|       for( j = 0; j < 6; j++ ) { | |
|         alf_chroma_coeff_abs[ altIdx ][ j ] | uek (v) |
|         if( alf_chroma_coeff_abs[ altIdx ][ j ] > 0 ) | |
|           alf_chroma_coeff_sign[ altIdx ][ j ] | u (1) |
|       } | |
|       if( alf_chroma_clip_flag[ altIdx ] ) { | |
|         for( j = 0; j < 6; j++ ) | |
|           alf_chroma_clip_idx[ altIdx ][ j ] | u (2) |
|       } | |
|     } | |
|   } | |
| } | |

50

Alternatively, the following may apply:

| | Descriptor |
|---|---|
| alf_data( ) { | |
|   alf_luma_filter_signal_flag | u (1) |
|   alf_chroma_filter_signal_flag | u (1) |
|   if( alf_luma_filter_signal_flag ) { | |
|     alf_luma_clip_flag | u (1) |
|     alf_luma_num_filters_signalled_minus1 | ue (v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u (v) |
|     } | |
|     [[ alf_luma_coeff_signalled_flag | u (1) |
|     if( alf_luma_coeff_signalled_flag ) { | |
|       for( sfIdx = 0; sfIdx <= alf_luma_num_filters_signalled_minus1; sfIdx++ ) | |

|  | Descriptor |
|---|---|
|         alf_luma_coeff_flag[ sfIdx ] | u (1) |
|       } ]] | |
|     for( sfIdx = 0; sfIdx <= alf_luma_num_filters_signalled_minus1; sfIdx++ ) { | |
|     [[ if( alf_luma_coeff_flag[ sfIdx ] ) { ]] | |
|         for ( j = 0; j < 12; j++ ) { | |
|             alf_luma_coeff_abs[ sfIdx ][ j ] | uek (v) |
|             if( alf_luma_coeff_abs[ sfIdx ][ j ] ) | |
|                 alf_luma_coeff_sign[ sfIdx ][ j ] | u (1) |
|         } | |
|     [[ } ]] | |
|     } | |
|     if( alf_luma_clip_flag ) { | |
|         for( sfIdx = 0; sfIdx <= alf_luma_num_filters_signalled_minus1; sfIdx++ ) { | |
|     [[ if( alf_luma_coeff_flag[ sfIdx ] ) { ]] | |
|         for ( j =0; j <12; j++ ) | |
|             alf_luma_clip_idx[ sfIdx ][ j ] | u (2) |
|     [[ } ]] | |
|         } | |
|     } | |
| } | |
| if( alf_chroma_filter_signal_flag ) { | |
|     alf_chroma_num_alt_filters_minus1 | ue (v) |
|     for( altIdx = 0; altIdx <= alf_chroma_num_alt_filters_minus1; altIdx++ ) { | |
|         alf_chroma_clip_flag[ altIdx ] | u (1) |
|         for( j = 0; j < 6; j++ ) { | |
|             alf_chroma_coeff_abs[ altIdx ][ j ] | uek (v) |
|             if( alf_chroma_coeff_abs[ altIdx ][ j ] > 0 ) | |
|                 alf_chroma_coeff_sign[ altIdx ][ j ] | u (1) |
|         } | |
|         if( alf_chroma_clip_flag[ altIdx ] ) { | |
|             for( j = 0; j < 6; j++ ) | |
|                 alf_chroma_clip_idx[ altIdx ][ j ] | u (2) |
|         } | |
|     } | |
| } | |

7.4.3.14 Adaptive Loop Filter Data Semantics alf_luma_filter_signal_flag equal to 1 specifies that a luma filter set is signalled.

alf_luma_filter_signal_flag equal to 0 specifies that a luma filter set is not signalled.

alf_chroma_filter_signal_flag equal to 1 specifies that a chroma filter is signalled.

alf_chroma_filter_signal_flag equal to 0 specifies that a chroma filter is not signalled. When ChromaArrayType is equal to 0, alf_chroma_filter_signal_flag shall be equal to 0. The variable NumAlfFilters specifying the number of different adaptive loop filters is set equal to 25.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adpative loop filter classes for which luma coefficients can be signalled. The value of alf_luma_num_filters_signalled_minus1 shall be in the range of 0 to NumAlfFilters−1, inclusive.

alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log2(alf_luma_num_filters_signalled_minus1+1)) bits.

[[alf_luma_coeff_signalled_flag equal to 1 indicates that alf_luma_coeff_flag[sfIdx] is signalled. alf_luma_coeff_signalled_flag equal to 0 indicates that alf_luma_coeff_flag[sfIdx] is not signalled.

alf_luma_coeff_flag[sfIdx] equal 1 specifies that the coefficients of the luma filter indicated by sfIdx are signalled. alf_luma_coeff_flag[sfIdx] equal to 0 specifies that all filter coefficients of the luma filter indicated by sfIdx are set equal to 0. When not present, alf_luma_coeff_flag[sfIdx] is set equal to 1. ]]

alf_luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0.

The order k of the exp-Golomb binarization uek(v) is set equal to 3.

alf_luma_coeff_sign[sfIdx][j] specifies the sign of the j-th luma coefficient of the filter indicated by sfIdx as follows:
- If alf_luma_coeff_sign[sfIdx][j] is equal to 0, the corresponding luma filter coefficient has a positive value.
- Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

The variable filtCoeff[sfIdx][j] with sfIdx=0 . . . alf_luma_num_filters_signalled_minus1, j=0 . . . 11 is initialized as follows:

filtCoeff[sfIdx][j]=alf_luma_coeff_abs[sfIdx][j]*(7-47)
(1-2*alf_luma_coeff_sign[sfIdx][j])

The luma filter coefficients $AlfCoeff_L$[adaptation_parameter_set_id] with elements $AlfCoeff_L$[adaptation_parameter_set_id][filtIdx][j], with filtIdx=0 . . . NumAlfFilters−1 and j=0 . . . 11 are derived as follows:

$AlfCoeff_{L[adaptation\_paramet\_set\_id][filtIdx][j]} = filtCoeff[alf\_luma\_coeff\_delta\_idx\ [filtIx]][j]$ (7-48)

5.2. Embodiment #2

This embodiment gives an example on how to signal ALF parameters for luma CTBs.

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   if( slice_alf_enabled_flag ){ | |
|     alf_ctb_flag[ 0 ][ xCtb >> CtbLog2SizeY ][ yCtb >> CtbLog2SizeY ] | ae (v) |
|     if( alf_ctb_flag[ 0 ][ xCtb >> CtbLog2SizeY ][ yCtb >> CtbLog2SizeY ] ) { | |
|       if( slice_num_alf_aps_ids_luma > 0 ) | |
|   [[ alf_ctb_use_first_aps_flag | ae (v) |
|       if( !alf_ctb_use_first_aps_flag ) { | |
|         if( slice_num_alf_aps_ids_luma > 1 ) ]] | |
|           alf_use_aps_flag | ae (v) |
|         if( alf_use_aps_flag ) { | |
|           if( slice_num_alf_aps_ids_luma > {{1}}[[2]] ) | |
|             alf_luma_prev_filter_idx[[_minus1]] | ae (v) |
|         } else | |
|           alf_luma_fixed_filter_idx | ae (v) |
|   [[ } ]] | |
|   } | |
|   if( slice_alf_chroma_idc = = 1 \|\| slice_alf_chroma_idc = = 3 ) { | |
|     alf_ctb_flag[ 1 ][ xCtb >> CtbLog2SizeY ][ yCtb >> CtbLog2SizeY ] | ae (v) |
|     if( alf_ctb_flag[ 1 ][ xCtb >> CtbLog2SizeY ][ yCtb >> CtbLog2SizeY ] | |
|       && aps_alf_chroma_num_alt_filters_minus1 > 0 ) | |
|       alf_ctb_filter_alt_idx[ 0 ][ xCtb >> CtbLog2SizeY ][ yCtb >> CtbLog2SizeY ] | ae (v) |
|   } | |
|   if( slice_alf_chroma_idc = = 2 \|\| slice_alf_chroma_idc = = 3 ) { | |
|     alf_ctb_flag[ 2 ][ xCtb >> CtbLog2SizeY ][ yCtb >> CtbLog2SizeY ] | ae (v) |
|     if( alf_ctb_flag[ 2 ][ xCtb >> CtbLog2SizeY ][ yCtb >> CtbLog2SizeY ] | |
|       && aps_alf_chroma_num_alt_filters_minus1 > 0 ) | |
|       alf_ctb_filter_alt_idx[ 1 ][ xCtb >> CtbLog2SizeY ][ yCtb >> CtbLog2SizeY ] | ae (v) |
|   } | |
| } | |
| if( slice_type = = I && qtbtt_dual_tree_intra_flag ) | |
|   dual_tree_implicit_qt_split ( xCtb, yCtb, CtbSizeY, 0 ) | |
| else | |
|   coding_tree ( xCtb, yCtb, CtbSizeY, CtbSizeY, 1, 1, 0, 0, 0, 0, 0, | |
|         SINGLE_TREE, MODE_TYPE_ALL ) | |
| } | |

[[alf_ctb_use_first_aps_flag equal to 1 specifies that the filter information in APS with adaptive_parameter_set_id equal to slice alf_aps_id_luma[0] is used.

alf_ctb_use_first_aps_flag equal to 0 specifies that the luma CTB does not use the filter information in APS with adaptive_parameter_set_id equal to slice_alf_aps_id_luma[0]. When alf_ctb_use_first_aps_flag is not present, it is inferred to be equal to 0.]]

alf_use_aps_flag equal to 0 specifies that one of the fixed filter sets is applied to the luma CTB. alf_use_aps_flag equal to 1 specifies that a filter set from an APS is applied to the luma CTB. When alf_use_aps_flag is not present, it is inferred to be equal to 0.

alf_luma_prev_filter_idx[[_minus1 plus 1]] specifies the previous filter that is applied to the luma CTB. The value of alf_luma_prev_filter_idx[[_minus1]] shall be in a range of 0 to slice_num_alf_aps_ids_luma−{{1}}[[2]], inclusive. When alf_luma_prev_filter_idx[[_minus1]] is not present, it is inferred to be equal to 0.

The variable AlfCtbFiltSetIdxY[xCtb>>CtbLog2SizeY][yCtb>>CtbLog2SizeY] specifying the filter set index for the luma CTB at location (xCtb, yCtb) is derived as follows:

[[If alf_ctb_use_first_aps_flag is equal to 1,

AlfCtbFiltSetIdxY[xCtb>>CtbLog2SizeY][yCtb>>CtbLog2SizeY] is set equal to 16.

Otherwise]] if alf_use_aps_flag is equal to 0,

AlfCtbFiltSetIdxY[xCtb>>CtbLog2SizeY][yCtb>>CtbLog2SizeY] is set equal to alf_luma_fixed_filter_idx.

Otherwise, AlfCtbFiltSetIdxY[xCtb>>CtbLog2SizeY][yCtb>>CtbLog2SizeY] is set equal to {{16+alf_luma_prev_filter_idx}}[[17+alf_luma_prev_filter_idx_minus1]].

alf_luma_fixed_filter_idx specifies the fixed filter that is applied to the luma CTB. The value of alf_luma_fixed_filter_idx shall be in a range of 0 to 15, inclusive.

TABLE 9-77

Syntax elements and associated binarizations

| Syntax structure | Syntax element | Binarization | |
|---|---|---|---|
| | | Process | Input parameters |
| slice_data( ) | end_of_brick_one_bit | FL | cMax = 1 |
| coding_tree_unit( ) | alf_ctb_flag[ ][ ][ ] | FL | cMax = 1 |
| | [[alf_ctb_use_first_aps_flag | FL | cMax = 1]] |
| | alf_use_aps_flag | FL | cMax = 1 |
| | alf_luma_fixed_filter_idx | TB | cMax = 15 |
| | alf_luma_prev_filter_idx[[_minus 1]] | TB | cMax = slice_num_alf_aps_ids_luma - {{1}}[[2]] |
| | alf_ctb_filter_alt_idx[ ][ ][ ] | TR | cMax = alf_chroma_num_alt_filters_minus1, cRiceParam = 0 |

Figure 9:
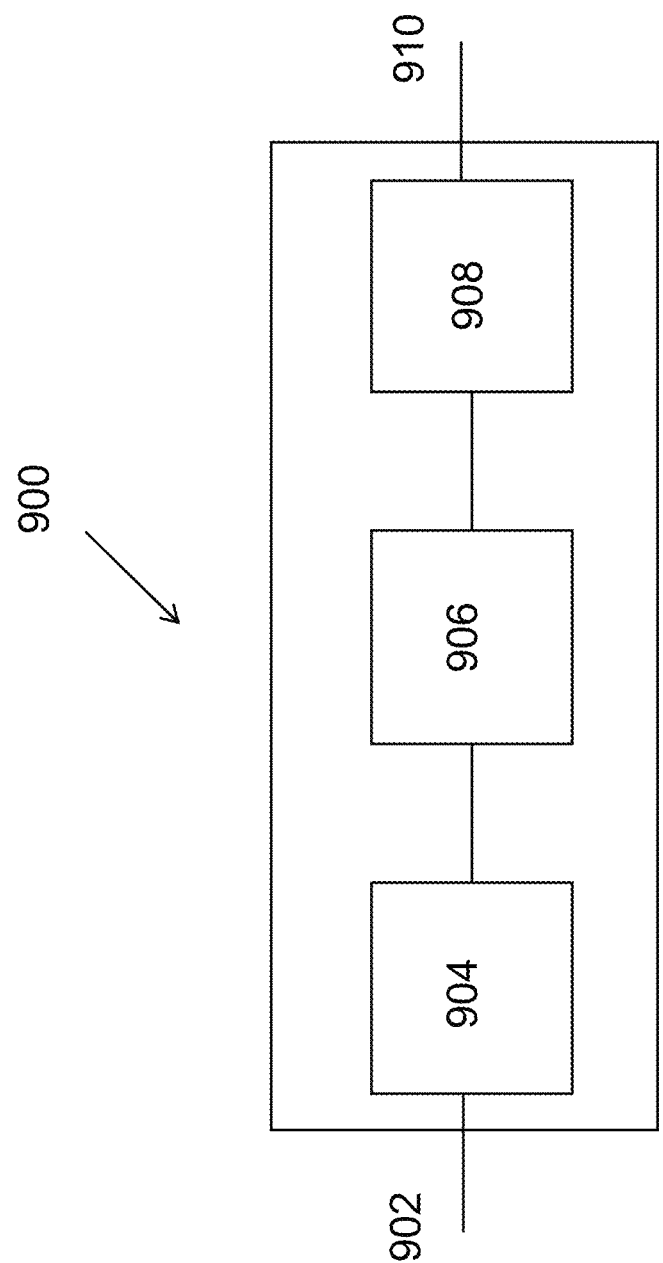
FIG. 9 is a block diagram of a video system.

FIG. 9 is a block diagram showing an example video processing system 900 in which various techniques disclosed herein may be implemented. Various implementations may include some or all of the components of the system 900. The system 900 may include input 902 for receiving video content. The video content may be received in a raw or uncompressed format, e.g., 8 or 10 bit multi-component pixel values, or may be in a compressed or encoded format. The input 902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 900 may include a coding component 904 that may implement the various coding or encoding methods described in the present document. The coding component 904 may reduce the average bitrate of video from the input 902 to the output of the coding component 904 to produce a coded representation of the video. The coding techniques are therefore sometimes called video compression or video transcoding techniques. The output of the coding component 904 may be either stored, or transmitted via a communication connected, as represented by the component 906. The stored or communicated bitstream (or coded) representation of the video received at the input 902 may be used by the component 908 for generating pixel values or displayable video that is sent to a display interface 910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 10:
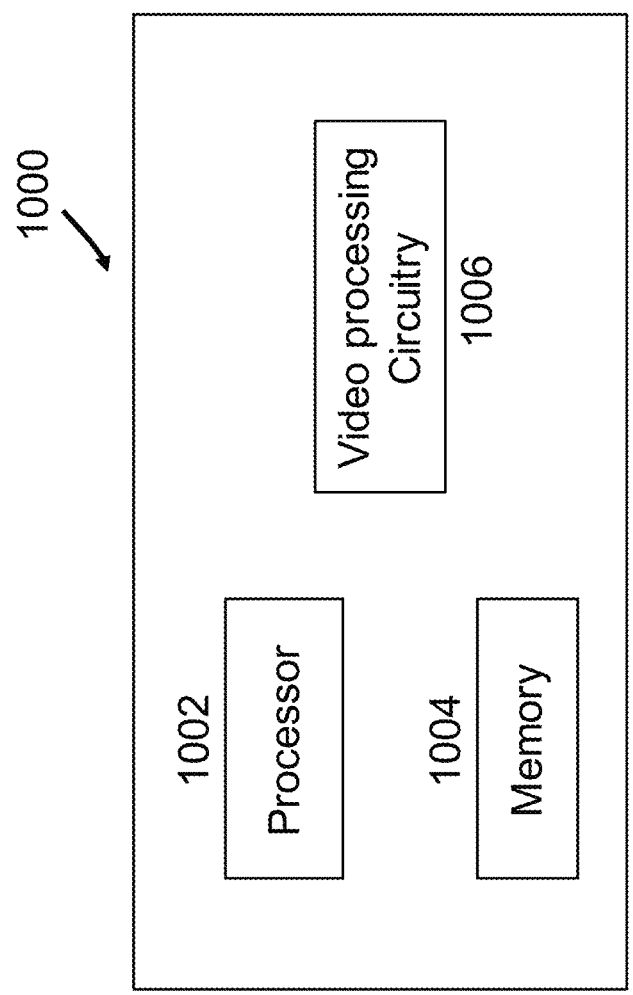
FIG. 10 is a block diagram of an example of a video processing apparatus.

FIG. 10 is a block diagram of a video processing apparatus 1000. The apparatus 1000 may be used to implement one or more of the methods described herein. The apparatus 1000 may be embodied in a smartphone, tablet, computer, Internet of Things (IoT) receiver, and so on. The apparatus 1000 may include one or more processors 1002, one or more memories 1004 and video processing hardware 1006. The processor(s) 1002 may be configured to implement one or more methods described in the present document. The memory (memories) 1004 may be used for storing data and code used for implementing the methods and techniques described herein. The video processing hardware 1006 may be used to implement, in hardware circuitry, some techniques described in the present document. In some implementations, the hardware 1606 may be partially or completely a part of the processor 1002, e.g., a graphics processor.

Figure 11:
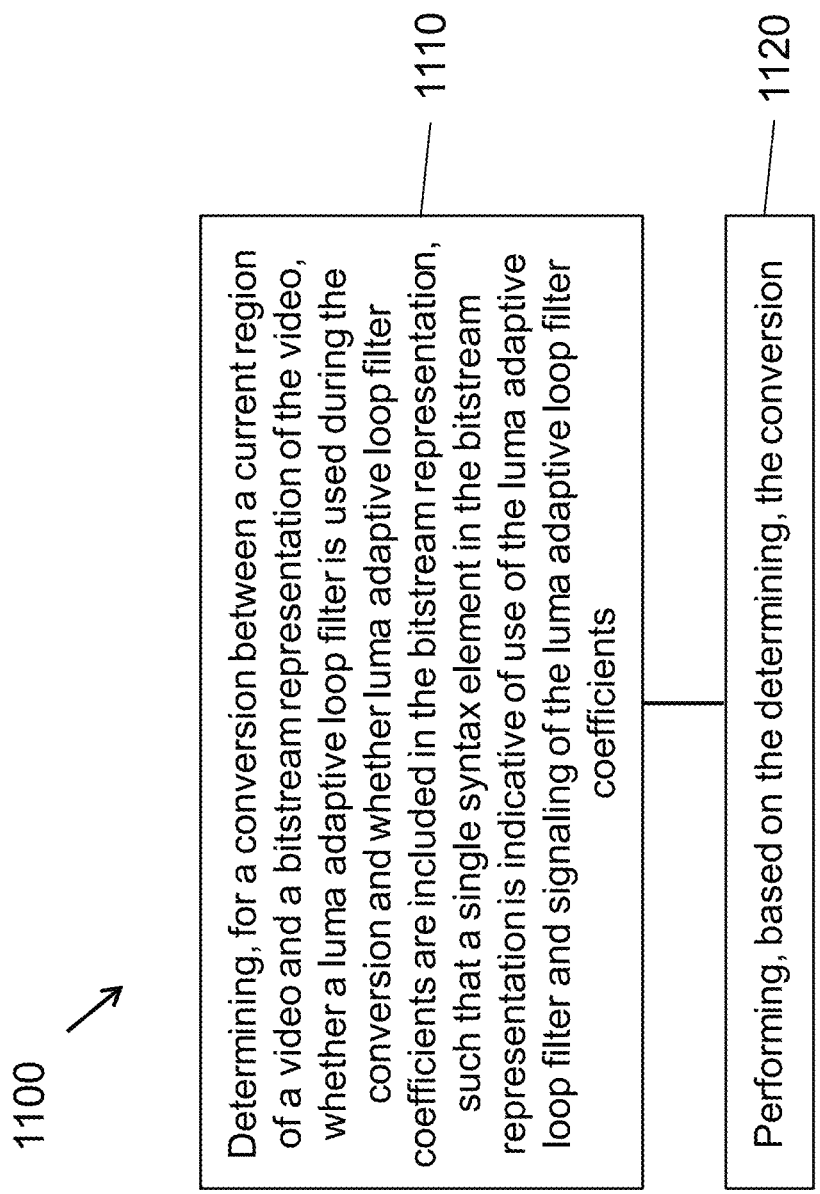
FIGS. 11-17 are flowcharts of example methods of video processing.

FIG. 11 is a flowchart of an example method of video processing. The method 1100 includes, at operation 1110, determining, for a conversion between a current region of a video and a bitstream representation of the video, whether a luma adaptive loop filter is used during the conversion and whether luma adaptive loop filter coefficients are included in the bitstream representation, such that a single syntax element in the bitstream representation is indicative of use of the luma adaptive loop filter and signaling of the luma adaptive loop filter coefficients.

The method 1100 includes, at operation 1120, performing, based on the determining, the conversion.

Figure 12:
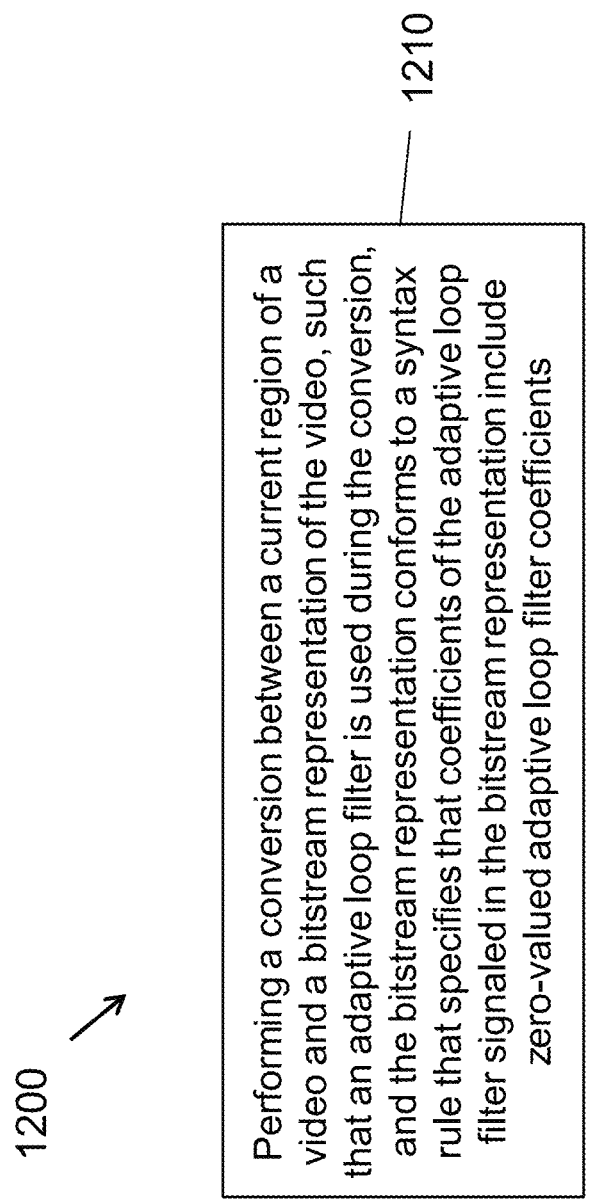

FIG. 12 is a flowchart of an example method of video processing. The method 1200 includes, at operation 1210, performing a conversion between a current region of a video and a bitstream representation of the video, such that an adaptive loop filter is used during the conversion, and the bitstream representation conforms to a syntax rule that specifies that coefficients of the adaptive loop filter signaled in the bitstream representation include zero-valued adaptive loop filter coefficients.

Figure 13:
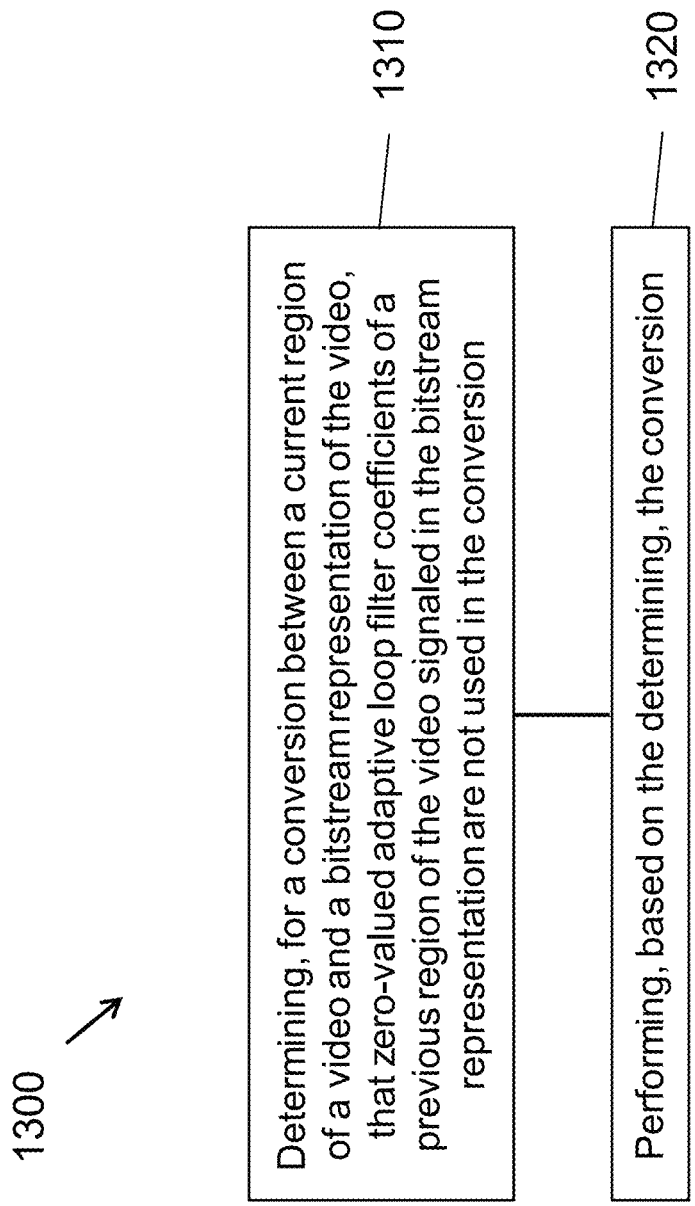

FIG. 13 is a flowchart of an example method of video processing. The method 1300 includes, at operation 1310, determining, for a conversion between a current region of a video and a bitstream representation of the video, that zero-valued adaptive loop filter coefficients of a previous region of the video signaled in the bitstream representation are not used in the conversion.

The method 1300 includes, at operation 1320, performing, based on the determining, the conversion.

Figure 14:
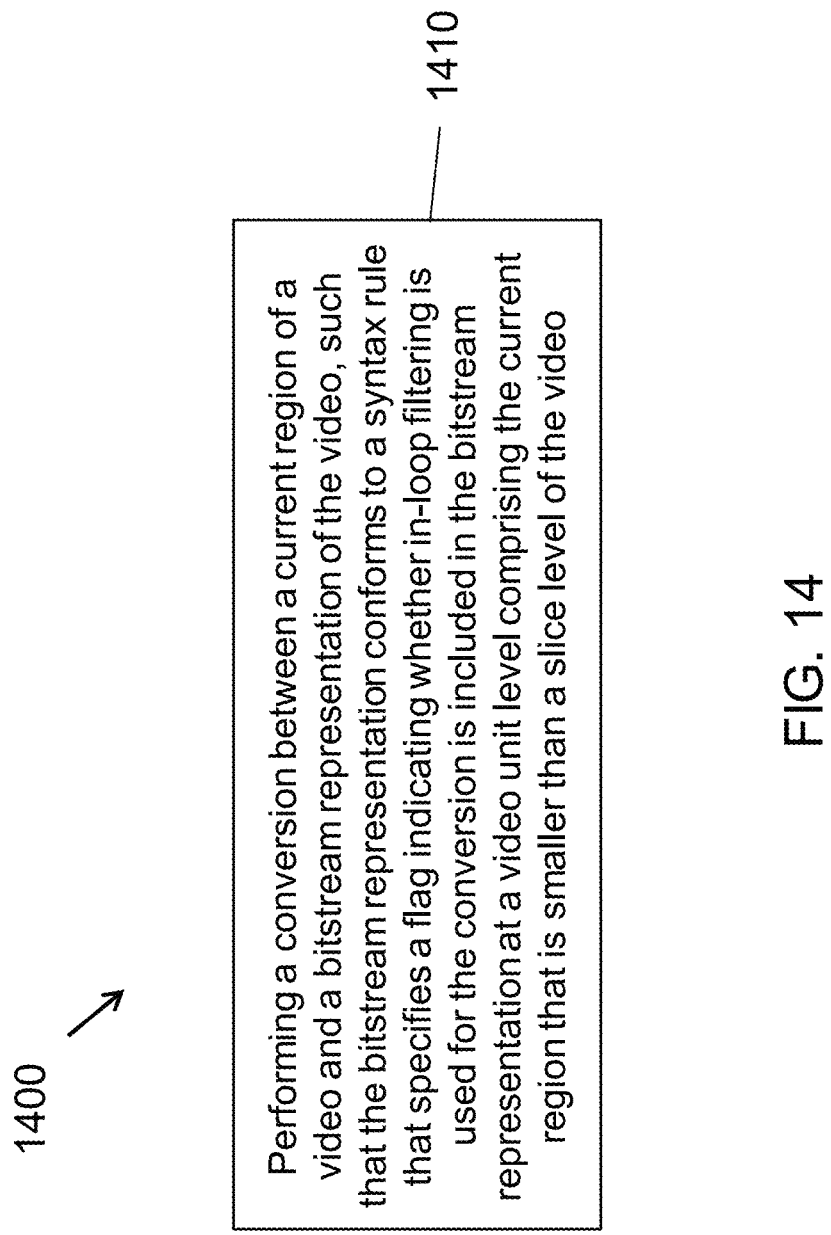

FIG. 14 is a flowchart of an example method of video processing. The method 1400 includes, at operation 1410, performing a conversion between a current region of a video and a bitstream representation of the video, such that the bitstream representation conforms to a syntax rule that specifies a flag indicating whether in-loop filtering is used for the conversion is included in the bitstream representation at a video unit level comprising the current region that is smaller than a slice level of the video.

Figure 15:
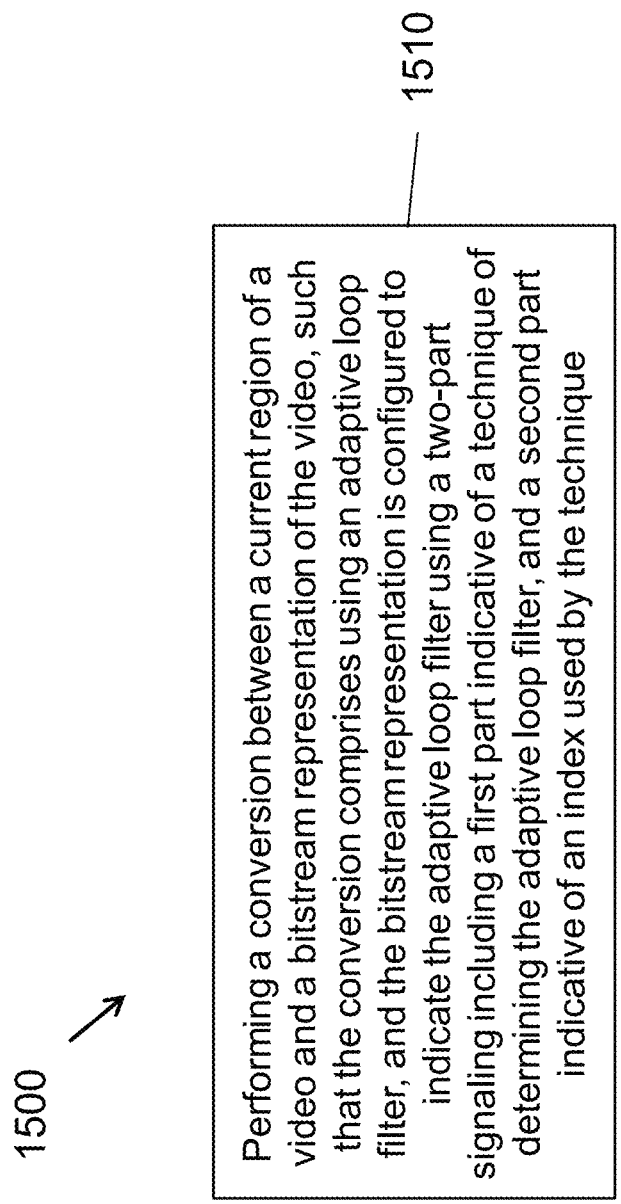

FIG. 15 is a flowchart of an example method of video processing. The method 1500 includes, at operation 1510, performing a conversion between a current region of a video and a bitstream representation of the video, such that the conversion comprises using an adaptive loop filter, and the bitstream representation is configured to indicate the adaptive loop filter using a two-part signaling including a first part indicative of a technique of determining the adaptive loop filter, and a second part indicative of an index used by the technique.

Figure 16:
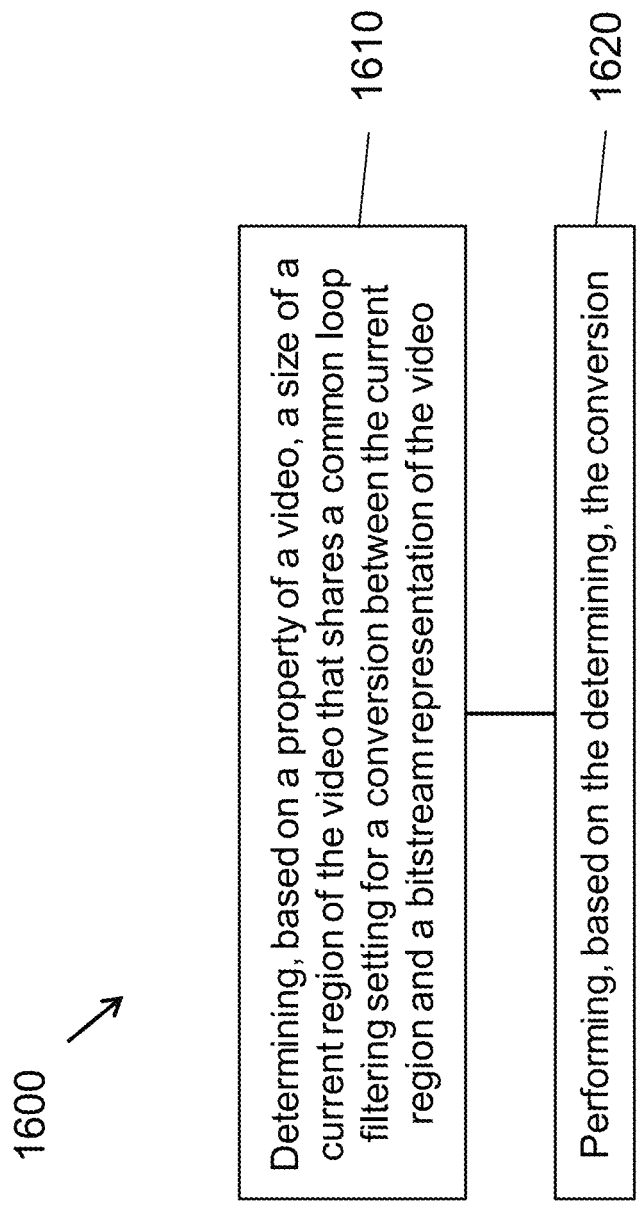

FIG. 16 is a flowchart of an example method of video processing. The method 1600 includes, at operation 1610, determining, based on a property of a video, a size of a current region of the video that shares a common loop filtering setting for a conversion between the current region and a bitstream representation of the video.

The method 1600 includes, at operation 1620, performing, based on the determining, the conversion.

Figure 17:
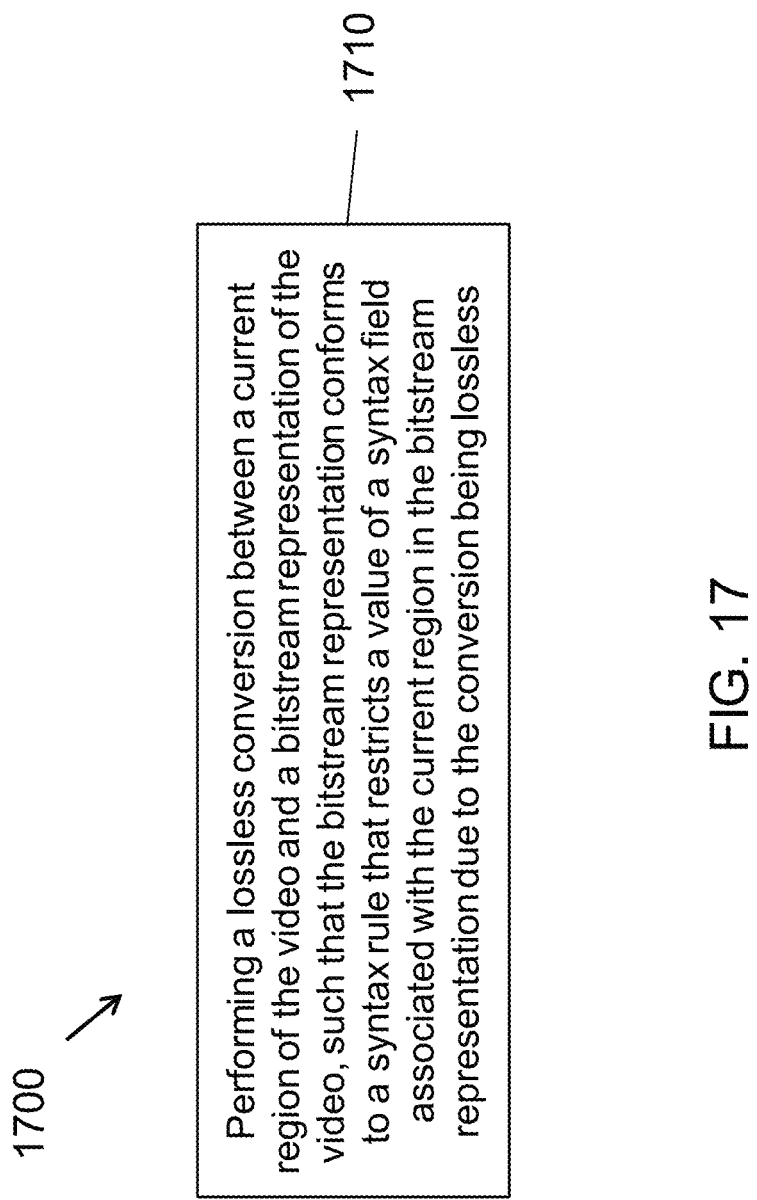

FIG. 17 is a flowchart of an example method of video processing. The method 1700 includes, at operation 1710, performing a lossless conversion between a current region of the video and a bitstream representation of the video, such that the bitstream representation conforms to a syntax rule that restricts a value of a syntax field associated with the current region in the bitstream representation due to the conversion being lossless.

The following solutions may be implemented as preferred technical solutions in some embodiments.

A1. A method of video processing, comprising determining, for a conversion between a current region of a video and a bitstream representation of the video, whether a luma adaptive loop filter is used during the conversion and whether luma adaptive loop filter coefficients are included in the bitstream representation, wherein a single syntax element in the bitstream representation is indicative of use of the luma adaptive loop filter and signaling of the luma adaptive loop filter coefficients; and performing, based on the determining, the conversion.

A2. The method of solution A1, wherein the single syntax element being one-valued indicates that the luma adaptive loop filter coefficients with a particular index are signaled, and wherein the single syntax element being zero-valued indicates that the luma adaptive loop filter coefficients with the particular index are excluded from the bitstream representation.

A3. The method of solution A2, wherein the single syntax element is alf_luma_coeff_flag, and wherein the particular index is denoted sfIdx.

A4. The method of any of solutions A1 to A3, wherein the single syntax element excludes alf_luma_coeff_signalled_flag.

A5. The method of solution A1, wherein the single syntax element being one-valued indicates that an indication of the use of the luma adaptive filter with a particular index is signaled, and wherein the single syntax element being zero-valued indicates that the indication of the use of the luma adaptive filter with the particular index is excluded from the bitstream representation.

A6. The method of solution A5, wherein the single syntax element is alf_luma_coeff_signalled_flag, and wherein the particular index is denoted sfIdx.

A7. The method of solution A1, wherein the luma adaptive loop filter coefficients are signaled in the bitstream representation conditionally based on whether at least one luma adaptive loop filter needs to be signaled.

A8. The method of solution A7, wherein the luma adaptive loop filter coefficients for multiple luma adaptive loop filters are signaled in reverse order of a filter index for the multiple luma adaptive loop filters.

A9. The method of solution A1, further comprising maintaining a counter to determine a number of luma adaptive loop filters that are coded in the bitstream representation.

A10. The method of solution A1, wherein the bitstream representation comprises at least one non-zero luma adaptive loop filter coefficient when the single syntax element indicative of the signaling of the luma adaptive loop filter coefficients is signaled.

A11. The method of solution A1, wherein the bitstream representation comprises at least one luma adaptive loop filter when the single syntax element indicative of the signaling of the luma adaptive loop filter coefficients is signaled.

A12. The method of any of solutions A1 to A11, wherein the luma adaptive loop filter coefficients are luma adaptive loop filter (ALF) coefficients.

A13. A method of video processing, comprising performing a conversion between a current region of a video and a bitstream representation of the video, wherein an adaptive loop filter is used during the conversion, and wherein the bitstream representation conforms to a syntax rule that specifies that coefficients of the adaptive loop filter signaled in the bitstream representation include zero-valued adaptive loop filter coefficients.

A14. The method of solution A13, wherein the syntax rule specifies signaling a single zero-valued coefficient for adaptive loop filter coefficients that share coefficient values due to symmetry.

A15. The method of solution A14, wherein 12 zero-valued coefficients are signaled for 7×7 diamond adaptive loop filter.

A16. The method of solution A13, wherein the syntax rule specifies limiting a number of adaptive loop filters with zero-valued adaptive loop filter coefficients to a number N, and wherein N is a non-negative integer.

A17. The method of solution A16, wherein N=1.

A18. A method of video processing, comprising determining, for a conversion between a current region of a video and a bitstream representation of the video, that zero-valued adaptive loop filter coefficients of a previous region of the video signaled in the bitstream representation are not used in the conversion; and performing, based on the determining, the conversion.

A19. The method of solution A18, wherein the current region corresponds to a luma region.

A20. The method of solution A18, wherein the current region corresponds to a chroma region.

A21. The method of any of solutions A18 to A20, wherein the current region corresponds to a picture, a slice, a tile, a brick, or a coding tree unit (CTU).

A22. The method of solution A18, wherein the zero-valued adaptive loop filter coefficients are signaled in a parameter set that is different from an adaptation parameter set (APS).

A23. A method of video processing, comprising performing a conversion between a current region of a video and a bitstream representation of the video, wherein the bitstream representation conforms to a syntax rule that specifies a flag indicating whether in-loop filtering is used for the conversion is included in the bitstream representation at a video unit level comprising the current region that is smaller than a slice level of the video.

A24. The method of solution A23, wherein the current region is a coding tree unit (CTU) or a coding tree block (CTB) of the video.

A25. The method of solution A23 or 24, wherein the video unit level corresponds to a brick level.

A26. The method of solution A23 or 24, wherein the video unit level corresponds to a tile level.

A27. The method of any of solutions A23 to A26, wherein the in-loop filtering comprises adaptive loop filtering (ALF) or sample adaptive offset (SAO) filtering.

A28. The method of any of solutions A23 to A27, wherein the bitstream representation includes a video unit flag to indicate that the in-loop filtering is applied to at least one sample in a video unit at the video unit level.

A29. The method of any of solutions A1 to A28, wherein performing the conversion comprises generating the bitstream representation from the current region.

A30. The method of any of solutions A1 to A28, wherein performing the conversion comprises generating the current region from the bitstream representation.

A31. An apparatus in a video system comprising a processor and a non-transitory memory with instructions thereon, wherein the instructions upon execution by the processor, cause the processor to implement the method in any one of solutions A1 to A30.

A32. A computer program product stored on a non-transitory computer readable media, the computer program product including program code for carrying out the method in any one of solutions A1 to A30.

A33. A computer readable medium that stores the bitstream representation generated according to the method in any one of solutions A1 to A30.

The following additional solutions may be implemented as preferred technical solutions in some embodiments.

B1. A method of video processing, comprising performing a conversion between a current region of a video and a bitstream representation of the video, wherein the conversion comprises using an adaptive loop filter, and wherein the bitstream representation is configured to indicate the adaptive loop filter using a two-part signaling including a first part indicative of a technique of determining the adaptive loop filter, and a second part indicative of an index used by the technique.

B2. The method of solution B1, wherein the technique comprises a selection from fixed filter sets or a selection from at least one adaptive loop filter (ALF) adaptation parameter set (APS).

B3. The method of solution B2, wherein the bitstream representation comprises a zero-valued flag indicating that a filter set of the adaptive loop filter is selected from the fixed filter sets.

B4. The method of solution B2 or B3, wherein the bitstream representation comprises a one-valued flag indicating that a filter set of the adaptive loop filter is selected from the at least one ALF APS.

B5. The method of solution B2, wherein the bitstream representation comprises a flag indicating that a number of ALF APSs used for a color component of the current region is greater than zero.

B6. The method of solution B5, wherein the color component is a luma component of the video.

B7. The method of solution B2, wherein the bitstream representation excludes a flag indicating that the adaptive loop filter is selected from the at least one ALF APS when a number of ALF APSs used for a color component of the current region is zero, and wherein the flag is inferred to indicate that the adaptive loop filter is selected from the fixed filter sets.

B8. The method of any of solutions B3 to B7, wherein the flag is context coded or bypass coded.

B9. The method of solution B3 or B4, wherein a value of the index is based on the flag.

B10. The method of solution B4, wherein whether to signal the index in the bitstream representation is based on a number of allowed ALF APSs for the current region.

B11. The method of solution B10, wherein the index is signaled in the bitstream representation when the number of allowed ALF APSs for the current region is greater than 1.

B12. The method of solution B10, wherein the index is excluded from the bitstream representation when the number of allowed ALF APSs for the current region is equal to 1.

B13. The method of any of solutions B10 to B12, wherein the current region comprises a slice, a tile, or a brick.

B14. The method of solution B4, wherein an indication of the index of the at least one ALF APS is signaled in the bitstream representation.

B15. The method of solution B14, wherein the indication is coded with a truncated unary method.

B16. The method of solution B14, wherein the indication is coded with a truncated binary method.

B17. The method of solution B15 or B16, wherein a maximum value of the indication is set to a number of allowed ALF APSs for the current region minus K, and wherein K is an integer.

B18. The method of solution B17, wherein K=0 or K=1.

B19. The method of solution B1, wherein the index is context coded.

B20. The method of solution B19, wherein a first K bins of a binarized bin string of the index are context coded and remaining bins are bypass coded, and wherein K is an integer.

B21. The method of solution B20, wherein K=1.

B22. The method of solution B19, wherein each of a plurality of bins of a binarized bin string of the index is bypass coded.

B23. The method of any of solutions B1 to B22, wherein the adaptive loop filter (ALF) is a filtering process that is applied as part of the conversion and is controlled by parameters of the adaptation parameter set (APS) in the bitstream representation.

B24. The method of any of solutions B1 to B23, wherein the adaptation parameter set (APS) is a syntax structure comprising one or more syntax elements that apply to zero or more slices of the video as determined by zero or more syntax elements in slice headers corresponding to the zero or more slices.

B25. A method of video processing, comprising determining, based on a property of a video, a size of a current region of the video that shares a common loop filtering setting for a conversion between the current region and a bitstream representation of the video; and performing, based on the determining, the conversion.

B26. The method of solution B25, wherein the property is a resolution of a picture comprising the current region.

B27. The method of solution B25, wherein the property is a maximum resolution of a picture comprising the current region.

B28. The method of solution B25, wherein a width in luma samples and a height in luma samples of a maximum size of a picture are denoted maxW and maxH, respectively, wherein a width in luma samples and a height in luma samples of a size of a current picture comprising the current region are denoted currW and currH, respectively, wherein a width and a height of a size of a current coding tree unit (CTU) or a current coding tree block (CTB) are denoted ctbW and ctbH, respectively, and wherein a width and a height of a size of the current region are denoted regW and regH, respectively.

B29. The method of solution B28, wherein regW=(ctbW× currW/maxW).

B30. The method of solution B28, wherein regH=(ctbH× currH/maxH).

B31. The method of solution B28, wherein regW or regH is based on a partitioning structure of the current CTB or the current CTU.

B32. A method of video processing, comprising performing a lossless conversion between a current region of the video and a bitstream representation of the video, wherein the bitstream representation conforms to a syntax rule that restricts a value of a syntax field associated with the current region in the bitstream representation due to the conversion being lossless.

B33. The method of solution B32, wherein the syntax rule specifies that a network abstraction layer (NAL) unit type is not equal to a NAL unit type of an adaptation parameter set (APS).

B34. The method of solution B32, wherein the syntax rule specifies that the value of the syntax field is different from one or more values in an adaptive loop filter (ALF) adaptation parameter set (APS).

B35. The method of solution B32, wherein the syntax rule specifies that the value of the syntax field is different from one or more values in a luma mapping with chroma scaling (LMCS) adaptation parameter set (APS).

B36. The method of solution B32, wherein the syntax rule specifies that the value of the syntax field is different from one or more values in a scaling list adaptation parameter set (APS).

B37. The method of any of solutions B1 to B36, wherein performing the conversion is further based on at least one or more of (a) video contents, (b) a message signaled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), an LCU row, a group of LCUs, a transform unit (TU), a prediction unit (PU), or a video coding unit, (c) a position of a coding unit (CU), the TU, the PU, the current block, or the video coding unit in a current picture comprising the current region, (d) decoded information of the current region, (e) an indication of a color format of the video, (f) a coding tree structure, (g) a slice type, a tile group type, or a picture type, (h) a color component of the video, (i) a temporal layer ID, and (j) a profile, a level or a tier of a standard.

B38. The method of any of solutions B1 to B37, wherein performing the conversion comprises generating the bitstream representation from the current region.

B39. The method of any of solutions B1 to B37, wherein performing the conversion comprises generating the current region from the bitstream representation.

B40. An apparatus in a video system comprising a processor and a non-transitory memory with instructions thereon, wherein the instructions upon execution by the processor, cause the processor to implement the method in any one of solutions B1 to B39.

B41. A computer program product stored on a non-transitory computer readable media, the computer program product including program code for carrying out the method in any one of solutions B1 to B39.

B42. A computer readable medium that stores the bitstream representation generated according to the method in any one of solutions B1 to B39.

In the above solutions, the performing the conversion includes using the results of previous decision step (e.g., using or not using certain coding or decoding steps) during the encoding or decoding operation to arrive at the conversion results. In the above-described solutions, video processing may include video coding or encoding or compressing or transcoding (changing from one format or bitrate to another format or bitrate), decoding or decompressing. Furthermore, these solutions may be applied to other visual data such as images.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   performing a conversion between a current block of a current region of a video and a bitstream of the video, wherein the conversion comprises using an adaptive loop filter for the current block, and wherein the bitstream is configured to indicate the adaptive loop filter using multiple syntax elements including:
   a first syntax element of the multiple syntax elements, the first syntax element being alf_use_aps_flag, and the first syntax element indicating whether a fixed filter set or a filter set from an adaptation parameter set (APS) is applied to the current block,
   a second syntax element of the multiple syntax elements, the second syntax element being alf_luma_prev_filter_idx, and the second syntax element indicative of an index of the filter set from the APS, and
   a third syntax element of the multiple syntax elements, the third syntax element being alf_luma_fixed_filter_idx, and the third syntax element indicative of an index of the fixed filter set,
   wherein the bitstream comprises a fourth syntax element in a slice header, the fourth syntax element being num_alf_aps_ids_luma, and the fourth syntax element indicating a number of adaptive loop filter APSs used for the current region,
   wherein the first syntax element is included in the bitstream when a value of the fourth syntax element in the slice header is greater than one and the first syntax element is included in the bitstream when the value of the fourth syntax element in the slice header is equal to one,
   wherein the second syntax element indicative of the index of the filter set from the APS is included in the bitstream when a value of the first syntax element is equal to one and the value of the fourth syntax element in the slice header is greater than one, and
   wherein the third syntax element is included in the bitstream when the value of the first syntax element is equal to zero.

2. The method of claim 1, wherein the first syntax element being zero indicating that the fixed filter set is applied to the current block.

3. The method of claim 1, wherein the first syntax element being one indicating that the filter set from the APS is applied to the current block.

4. The method of claim 1, wherein the bitstream excludes the first syntax element in response to the value of the fourth syntax element in the slice header being equal to zero, and wherein the first syntax element is inferred to indicate that the fixed filter set is applied to the current block.

5. The method of claim 1, wherein the second syntax element indicative of the index of the filter set from the APS is excluded from the bitstream in response to the value of the fourth syntax element in the slice header being equal to 1.

6. The method of claim 1, wherein the current region is a slice.

7. The method of claim 1, wherein the second syntax element indicative of the index of the filter set from the APS is coded with a truncated binary method.

8. The method of claim 1, wherein a maximum value of the second syntax element indicative of the index of the filter set from the APS is set to a number of allowed ALF APSs for the current region minus K, and wherein K=1.

9. The method of claim 1, wherein all bins of a binarized bin string of the second syntax element indicative of the index of the filter set from the APS are bypass coded.

10. The method of claim 1, wherein the conversion includes encoding the video into the bitstream.

11. The method of claim 1, wherein the conversion includes decoding the video from the bitstream.

12. An apparatus for processing video data comprising a processor and a non-transitory memory with instructions thereon, wherein the instructions upon execution by the processor, cause the processor to:
   perform a conversion between a current block of a current region of a video and a bitstream of the video, wherein the conversion comprises using an adaptive loop filter for the current block, and wherein the bitstream is configured to indicate the adaptive loop filter using multiple syntax elements including:
   a first syntax element of the multiple syntax element, the first syntax element being alf_use_aps_flag, and the first syntax element indicating whether a fixed filter set or a filter set from an adaptation parameter set (APS) is applied to the current block,
   a second syntax element of the multiple syntax element, the second syntax element being alf_luma_prev_filter_idx, and the second syntax element indicative of an index of the filter set from the APS, and a third syntax element of the multiple syntax elements, the third syntax element being alf_luma_fixed_filter_idx, and the third syntax element indicative of an index of the fixed filter set, wherein the bitstream comprises a fourth syntax element in a slice header, the fourth syntax element being num_alf_aps_ids_luma, and the fourth syntax element indicating a number of adaptive loop filter APSs used for the current region, wherein the first syntax element is included in the bitstream when a value of the fourth syntax element in the slice header is greater than one and the first syntax element is included in the bitstream when the value of the fourth syntax element in the slice header is equal to one, wherein the second syntax element indicative of the index of the filter set from the APS is included in the bitstream when a value of the first syntax element is equal to one and a value of the fourth syntax element in the slice header is greater than one, and wherein the third syntax element is included in the bitstream when the value of the first syntax element is equal to zero.

13. The apparatus of claim 12, wherein the first syntax element being zero indicating that the fixed filter set is applied to the current block;

wherein the first syntax element being one indicating that the filter set from the APS is applied to the current block;

wherein the bitstream excludes the first syntax element in response to the value of the fourth syntax element in the slice header being equal to zero, and wherein the first syntax element is inferred to indicate that the fixed filter set is applied to the current block; and wherein the second syntax element indicative of the index of the filter set from the APS is excluded from the bitstream in response to the value of the fourth syntax element in the slice header being equal to 1.

14. The apparatus of claim 12, wherein the current region is a slice;

wherein the second syntax element indicative of the index of the filter set from the APS is coded with a truncated binary method;

wherein a maximum value of the index of the filter set from the APS is set to a number of allowed ALF APSs for the current region minus K, and wherein K=1; and wherein all bins of a binarized bin string of the second syntax element indicative of the index of the filter set from the APS are bypass coded.

15. A non-transitory computer-readable storage medium storing instructions that cause a processor to:

perform a conversion between a current block of a current region of a video and a bitstream of the video, wherein the conversion comprises using an adaptive loop filter for the current block, and wherein the bitstream is configured to indicate the adaptive loop filter using a multiple syntax elements including:

a first syntax element of the multiple syntax elements, the first syntax element being alf_use_aps_flag, and the first syntax element indicating whether a fixed filter set or a filter set from an adaptation parameter set (APS) is applied to the current block, a second syntax element of the multiple syntax elements, the second syntax element being alf_lu-
ma_prev_filter_idx, and the second syntax element indicative of an index of the fixed filter set or the filter set from the APS, and a third syntax element of the multiple syntax elements, the third syntax element being alf_luma_fixed_filter_idx, and the third syntax element indicative of an index of the fixed filter set, wherein the bitstream comprises a fourth syntax element in a slice header, the fourth syntax element being num_alf_aps_ids_luma, and the fourth syntax element indicating a number of adaptive loop filter APSs used for the current region, wherein the first syntax element is included in the bitstream when a value of the fourth syntax element in the slice header is greater than one and the first syntax element is included in the bitstream when the value of the fourth syntax element in the slice header is equal to one, wherein the second syntax element indicative of the index of the filter set from the APS is included in the bitstream when a value of the first syntax element is equal to one and the value of the fourth syntax element in the slice header is greater than one, and wherein the third syntax element is included in the bitstream when the value of the first syntax element is equal to zero.

16. The non-transitory computer-readable storage medium of claim 15, wherein the first syntax element being zero indicating that the fixed filter set is applied to the current block;

wherein the first syntax element being one indicating that the filter set from the APS is applied to the current block;

wherein the bitstream excludes the first syntax element in response to the value of the fourth syntax element in the slice header being equal to zero, and wherein the first syntax element is inferred to indicate that the fixed filter set is applied to the current block;

wherein the second syntax element indicative of the index of the filter set from the APS is excluded from the bitstream in response to the value of the fourth syntax element in the slice header being equal to 1;

wherein the current region is a slice;

wherein the second syntax element indicative of the index of the filter set from the APS is coded with a truncated binary method;

wherein a maximum value of the second syntax element indicative of the index of the filter set from the APS is set to a number of allowed ALF APSs for the current region minus K, and wherein K=1; and wherein all bins of a binarized bin string of the second syntax element indicative of the index of the filter set from the APS are bypass coded.

17. A non-transitory computer-readable recording medium storing a bitstream of a video which is generated by a method performed by a video processing apparatus, wherein the method comprises:

generating the bitstream for a current block of a current region of the video, wherein the generating comprises using an adaptive loop filter for the current block, and wherein the bitstream is configured to indicate the adaptive loop filter using multiple syntax elements including:

a first syntax element of the multiple syntax elements, the first syntax element being alf_use_aps_flag, and the first syntax element indicating whether a fixed filter set or a filter set from an adaptation parameter set (APS) is applied to the current block, a second syntax element of the multiple syntax elements, the second syntax element being alf_luma_prev_filter_idx, and the second syntax element indicative of an index of the filter set from the APS, and a third syntax element of the multiple syntax elements, the third syntax element being alf_luma_fixed_filter_idx, and the third syntax element indicative of an index of the fixed filter set, wherein the bitstream comprises a fourth syntax element in a slice header, the fourth syntax element being num_alf_aps_ids_luma, and the fourth syntax element indicating a number of adaptive loop filter APSs used for the current region, wherein the first syntax element is included in the bitstream when a value of the fourth syntax element in the slice header is greater than one and the first syntax element is included in the bitstream when the value of the fourth syntax element in the slice header is equal to one, wherein the second syntax element indicative of the index of the filter set from the APS is included in the bitstream when a value of the first syntax element is equal to one and the value of the fourth syntax element in the slice header is greater than one, and wherein the third syntax element is included in the bitstream when the value of the first syntax element is equal to zero.

18. The non-transitory computer-readable recording medium of claim 17, wherein the first syntax element being zero indicating that the fixed filter set is applied to the current block;

wherein the first syntax element being one indicating that the filter set from the APS is applied to the current block;

wherein the bitstream excludes the first syntax element in response to the value of the fourth syntax element in the slice header being equal to zero, and wherein the first syntax element is inferred to indicate that the fixed filter set is applied to the current block;

wherein the second syntax element indicative of the index of the filter set from the APS is excluded from the bitstream in response to the value of the fourth syntax element in the slice header being equal to 1;

wherein the current region is a slice;

wherein the second syntax element indicative of the index of the filter set from the APS is coded with a truncated binary method;

wherein a maximum value of the second syntax element indicative of the index of the filter set from the APS is set to a number of allowed ALF APSs for the current region minus K, and wherein K=1; and wherein all bins of a binarized bin string of the second syntax element indicative of the index of the filter set from the APS are bypass coded.

* * * * *

UNITED STATES PATENT AND TRADEMARK OFFICE
CERTIFICATE OF CORRECTION

| | |
|---|---|
| PATENT NO. | : 11,683,531 B2 |
| APPLICATION NO. | : 17/696560 |
| DATED | : June 20, 2023 |
| INVENTOR(S) | : Li Zhang et al. |

It is certified that error appears in the above-identified patent and that said Letters Patent is hereby corrected as shown below:

On the Title Page

Item (30) Foreign Application Priority Data, delete:
"Sep. 18, 2020 (WO) ............ PCT/CN2019/106420"
And insert:
-- Sep. 18, 2019 (WO) ............ PCT/CN2019/106420 --, therefor.

Signed and Sealed this
Fourteenth Day of May, 2024

Katherine Kelly Vidal
*Director of the United States Patent and Trademark Office*